United States Patent [19]
Schmidt

[11] Patent Number: 5,558,588
[45] Date of Patent: Sep. 24, 1996

[54] TWO-MODE, INPUT-SPLIT, PARALLEL, HYBRID TRANSMISSION

[75] Inventor: Michael R. Schmidt, Carmel, Ind.

[73] Assignee: General Motors Corporation, Detroit, Mich.

[21] Appl. No.: 389,464

[22] Filed: Feb. 16, 1995

[51] Int. Cl.$^6$ .................................. F16H 3/72; B60K 1/00
[52] U.S. Cl. .............................................. 475/5; 180/65.2
[58] Field of Search ........................... 475/3, 5; 180/65.2, 180/65.3, 69.6; 290/4 C, 8

[56] References Cited

U.S. PATENT DOCUMENTS

| | | | |
|---|---|---|---|
| 3,799,284 | 3/1974 | Hender | 475/5 X |
| 4,335,429 | 6/1982 | Kawakatsu | 180/65.2 X |
| 4,579,019 | 4/1986 | Gabriele | 475/5 |

FOREIGN PATENT DOCUMENTS

| | | | |
|---|---|---|---|
| 1411170 | 7/1988 | U.S.S.R. | 180/69.6 |
| 624179 | 5/1949 | United Kingdom | 180/65.2 |
| 2275309 | 8/1994 | United Kingdom | 180/65.2 |

*Primary Examiner*—Khoi Q. Ta
*Attorney, Agent, or Firm*—Donald F. Scherer

[57] ABSTRACT

A variable, two-mode, input-split, parallel, hybrid electric transmission for a vehicle has an input shaft receiving power from the vehicle engine, and an output shaft delivering power to drive the vehicle. First and second motor/generators are employed as are energy storage devices, such as batteries, for accepting power from, and supplying power to, the first and second motor/generators. A control unit regulates power flow between the energy storage devices and the motor/generators as well as between the first and second motor/generators. At least one planetary gear set is used. Each planetary gear set has an inner gear member and an outer gear member, each of which meshingly engage a plurality of planet gear members supported on a carrier. The input shaft is operatively connected to one of the gear members in the planetary gear set, and the output shaft is operatively connected to one of the other gear members in the planetary gear set. One of the motor/generators is connected to at least the remaining gear member in the planetary gear set, and the other motor/generator is operatively connected to the output shaft. A second planetary gear set may be interposed between one of the motor/generators and the output shaft and/or between the output shaft and the first planetary gear set.

23 Claims, 11 Drawing Sheets

TWO-MODE, INPUT-SPLIT, PARALLEL, HYBRID TRANSMISSION

TECHNICAL FIELD

The present invention relates generally to vehicular transmissions. More particularly, the present invention relates to a vehicular transmission that is capable of receiving input power from either an engine, a source of stored electrical energy, or both. Specifically, the present invention relates to an input-split, parallel, hybrid, vehicular transmission that utilizes at least one planetary gear set that is operatively connected to an engine and a motor/generator as well as an output shaft of the transmission. A second motor/generator is also mechanically connected to the transmission output shaft, and two modes or gear trains are selectively available, as by the utilization of at least two torque transfer devices, to transmit power from the engine and/or the motor/generator to the output shaft, and vice versa, depending upon the desired ranges of output speed desired at the output shaft.

BACKGROUND OF THE INVENTION

Public concern about air quality and the federal air laws have created a large demand for low emission vehicles. One form of a low emission vehicle is an electric vehicle, and the first electric powered vehicles employed transmissions that received power from a source of stored electrical energy, such as a battery. Energy from the battery powered an electric motor which, in turn, drove the wheels of the vehicle through a transmission. When the charge on the battery was expended, there was no more energy available, and the vehicle could not move on its own until the battery was recharged. In order to extend the range of such vehicles, an engine and a generator were incorporated to convert a fossil fuel into electrical energy. Typically, the engine would drive the generator, and the resulting electrical energy was directed either to the battery, so that it might be recharged, or to one or more electrical motors that could assist in driving the vehicle wheels. This type system is designated as a series, hybrid propulsion system.

In short, a series, hybrid system is a system in which energy follows a path from an engine to an electric storage device and then to an electrical motor which applies power to rotate the wheels. There is no direct mechanical connection between the engine and the wheels in a series, hybrid propulsion system.

Series, hybrid propulsion systems for vehicles are generally provided with a low-power engine for minimum emissions and high fuel economy. Such systems are inefficient when the vehicle requires high-average output power or operates at continuous constant speeds. Moreover, high efficiency is not available when the vehicle is required to climb steep grades or when the vehicle must sustain high-average cruising speeds. It is also recognized that the series, hybrid transmission requires sizable motor/generators and must be available in a wide variety of motor sizes so that a motor may be individually selected to provide the requisite power for specific vehicle weights and anticipated loads.

The challenge is to provide a power system that will operate at high efficiencies over a wide variety of operating conditions. Desirable electric variable transmissions should leverage the benefits of a series, hybrid transmission for desirable low-average power duty cycles—i.e.: low speed start/stop duty cycles—as well as the benefits of a parallel hybrid transmission for high-average output power, high speed duty cycles.

Transmissions adapted to receive the output power from either an engine or an electric motor, or both, have heretofore relied largely on what has been designated as series, hybrid propulsion systems. Such systems are designed with auxiliary power units (APU's) of relatively low power for minimum emissions and best fuel economy. However, such systems using a small APU and a large energy storage device will not accommodate high-average power vehicles or address city duty cycles that demand continuous constant speed operation. Steep grades and sustained high-average cruising speeds at desired high efficiencies are not achievable with a typical, series, hybrid transmission configuration.

Moreover, perfecting a concept wherein two modes or gear trains are available for synchronous selection by the on-board computer to transmit power from the engine and/or the motor/generator to the output shaft, results in a hybrid transmission having an extremely wide range of applications.

SUMMARY OF THE INVENTION

It is, therefore, a primary object of the present invention to furnish a hybrid transmission that provides the desired high efficiency sought for continuous constant speed operation as well as high-average power applications.

It is another object of the present invention to furnish a hybrid transmission, as above, that provides the desired high efficiency sought for continuous constant speed operation and high-average power applications.

It is also an object of the present invention to furnish a hybrid transmission, as above, that provides improved performance in the start/stop portions of a vehicles's duty cycle.

It is a further primary object of the present invention to furnish a hybrid transmission, as above, that provides not only higher efficiency in constant speed (low power) operation but also, by virtue of utilizing a parallel configuration, requires less cooling.

It is yet another object of the present invention to provide a hybrid transmission, as above, that allows operation under purely electrical power to achieve improved operation in urban areas or, alternatively, to achieve improved operation under conditions that require maximum stealth.

It is a still further object of the present invention to furnish a hybrid transmission, as above, that may utilize a smaller motor for a given medium output power requirement.

It is still another object of the present invention to provide a hybrid transmission, as above, which maximizes power density such that the transmission can be installed in existing military or commercial vehicles that have standard drop center axles so that the suspension or the brake systems need not be re-engineered.

It is an even further object of the present invention to provide a hybrid transmission, as above, that achieves continuously variable drive ratios.

It is also a prime object of the present invention to provide a hybrid transmission, as above, that employs two modes or gear trains that may be selectively engaged or disengaged, as by at least two torque transfer devices, to provide the desired output power for a wide range of vehicular applications.

These and other objects of the invention, as well as the advantages thereof over existing and prior art forms, which will be apparent in view of the following derailed specification, are accomplished by means hereinafter described and claimed.

In general, a variable, two-mode, input-split, parallel, hybrid electric transmission embodying the concepts of the present invention utilizes an input means to receive power from the vehicle engine and a power output means to deliver power to drive the vehicle. First and second motor/generators are connected to energy storage devices, such as batteries, so that the energy storage devices can accept power from, and supply power to, the first and second motor/generators. A control unit regulates power flow between the energy storage devices and the motor/generators as well as between the first and second motor/generators.

The transmission also employs at least one planetary gear set. The planetary gear set has an inner gear member and an outer gear member, each of which meshingly engages a plurality of planet gear members. The input means is operatively connected to one of the gear members in the planetary gear set, and means are provided operatively to connect the power output means to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. In one mode, the output speed of the transmission is proportional to the speed of one motor/generator, and in the second mode, the output speed of the transmission is proportional to the speed of the other motor/generator.

In some embodiments of the present invention, a second planetary gear set is employed. In addition, some embodiments may utilize three torque transfer devices—two to select the operational mode desired of the transmission and the third selectively to disconnect the transmission from the engine. In other embodiments, all three torque transfers may be utilized to select the desired operational mode of the transmission, and in at least one embodiment of the present invention, a third planetary gear set is employed.

As such, a transmission embodying the concepts of the present invention provides the desired high efficiency sought for continuous constant speed operation as well as high-average power applications. The present transmission also provides improved performance in the start/stop portions of a vehicles's duty cycle.

To acquaint persons skilled in the arts most closely related to the present invention, eight alternative embodiments, including three highly preferred embodiments of a variable, two-mode, input-split, parallel, hybrid electric transmission that illustrate the best modes now contemplated for putting the invention into practice are described herein by, and with reference to, the annexed drawings that form a part of the specification. The exemplary transmissions are described in detail without attempting to show all of the various forms and modification in which the invention might be embodied. As such, the embodiments shown and described herein are illustrative, and as will become apparent to those skilled in these arts, can be modified in numerous ways within the spirit and scope of the invention; the invention being measured by the appended claims and not by the details of the specification.

DESCRIPTION OF THE EXEMPLARY EMBODIMENTS

Description of the Exemplary Preferred Embodiment

Figure 1:
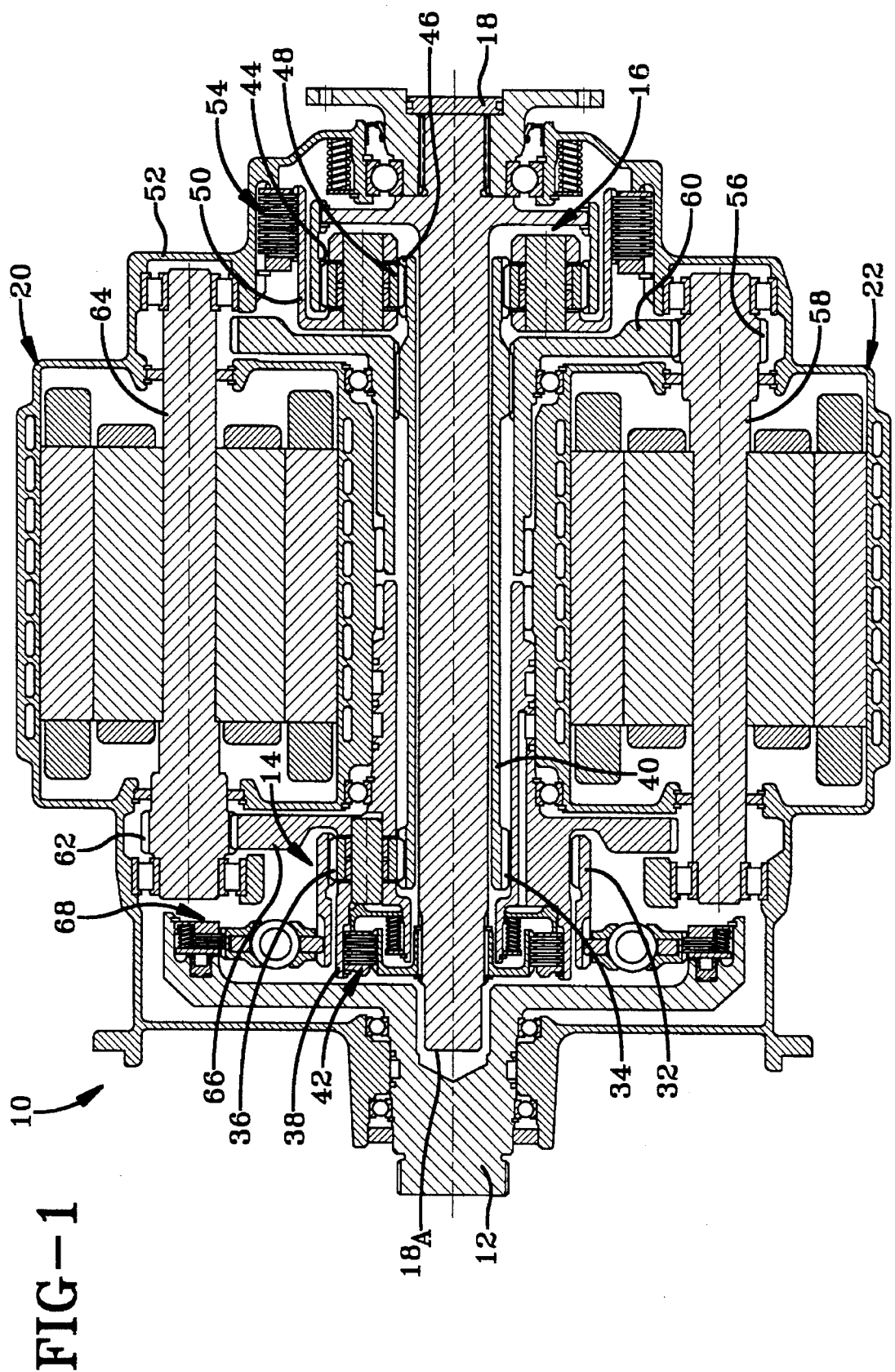
FIG. 1 is a diagrammatic, longitudinal cross section through a first representative preferred embodiment of a hybrid transmission embodying the concepts of the present invention.
Figure 2:
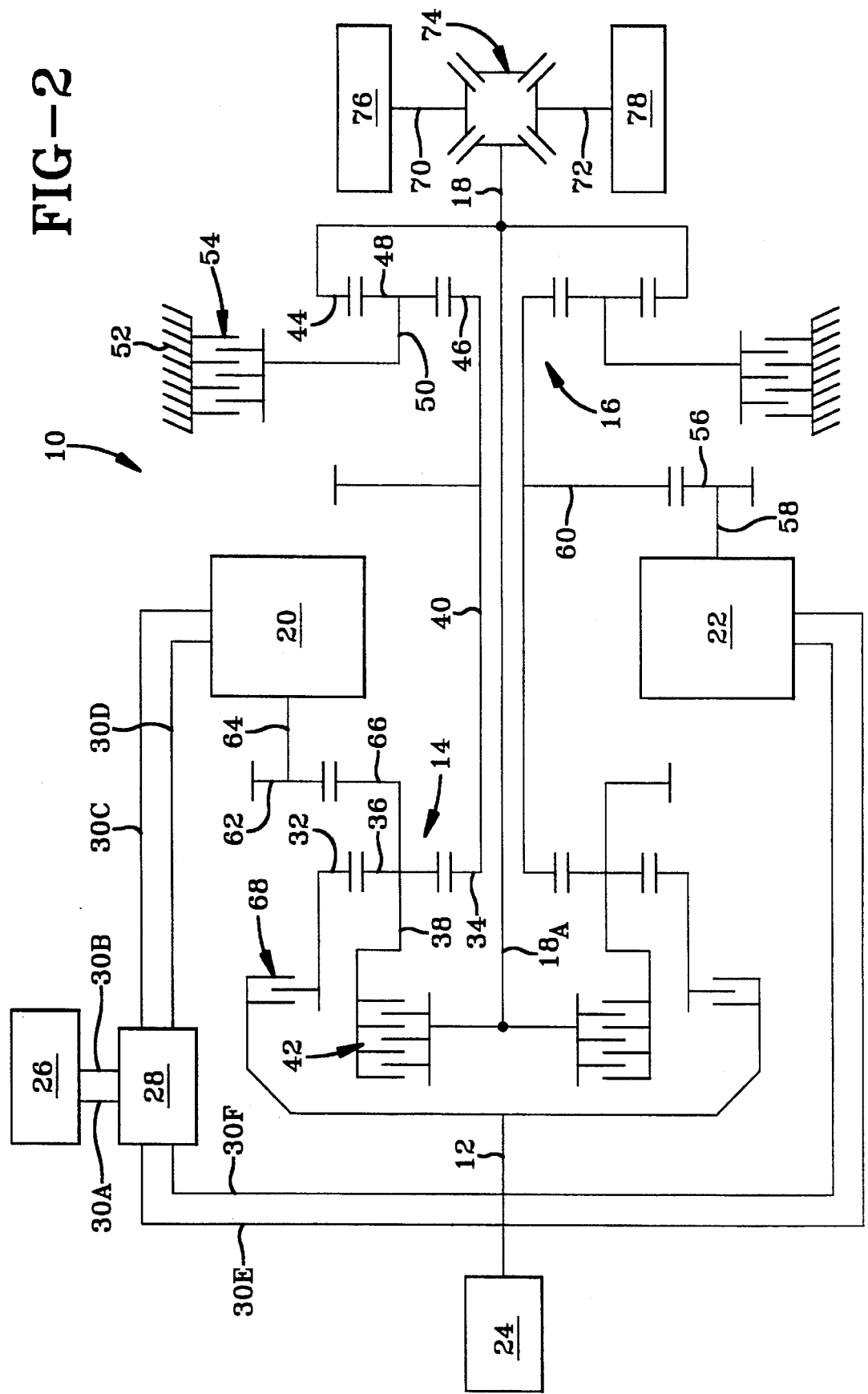
FIG. 2 is a schematic representation of the hybrid transmission depicted in FIG. 1.

One representative form of a hybrid transmission embodying the concepts of the present invention is designated generally by the numeral 10 on FIGS. 1 and 2. In particular, FIGS. 1 and 2 show that the transmission 10 has a power input means, such as shaft 12, first and second planetary gear sets 14 and 16, respectively, and an output means, such as shaft 18. The hybrid transmission 10 also utilizes first and second motor/generators 20 and 22 which are operatively connected with the respective first and second planetary gear sets 14 and 16. The hybrid transmission 10 is intended for use in a vehicle (not shown), such as a bus or armored vehicle, that is driven by an operator.

As best seen in FIG. 2, the hybrid transmission 10 selectively receives power from an engine 24 and an electric storage device 26. The hybrid transmission 10 can also receive feed-back power from the vehicle axles, as will be hereinafter more fully described, when the vehicle is decelerating. In this exemplary embodiment, the engine 24 may be a fossil fuel engine, and the electric storage device 26 may be one or more batteries. Other electric storage devices which have the ability to store electric power and dispense electric power may be used in place of the batteries without altering the concepts of the present invention. The electric storage device 26 communicates with an electrical control unit (ECU) 28 by transfer conductors 30A and 30B. The ECU 28 communicates with the first motor/generator 20 by transfer conductors 30C and 30D, and the ECU 28 similarly communicates with the second motor/generator 22 by transfer conductors 30E and 30F.

As previewed in the previous paragraph, and as will be apparent in the detailed description which follows, a particular structural member, component or arrangement may be employed at more than one location. When referring generally to that type of structural member, component or arrangement, a common numerical designation shall be employed. However, when one of the structural members, components or arrangements so identified is to be individually identified, it shall be referenced by virtue of a letter suffix employed in combination with the numerical designation employed for general identification of that structural member, component or arrangement. Thus, there are at least six transfer conductors which are generally identified by the numeral 30, but the specific, individual transfer conductors are, therefore, identified as 30A, 30B, 30C, 30D, 30E and 30F in the specification and on the drawings. This same suffix convention shall be employed throughout the specification.

Power from the engine 24 is selectively introduced into the hybrid transmission 10 through the connection of the input shaft 12 with the first planetary gear set 14. The first planetary gear set 14 has an outer gear member 32, generally designated as a ring gear, which circumscribes an inner gear member 34, generally designated as the sun gear. A plurality of planet gear members 36 are rotatably mounted on a carrier 38 such that each planet gear member 36 meshingly engages both the outer gear member 32 and the inner gear member 34. The inner gear member 34 may, as shown, be connected to a sleeve shaft 40 which rotatably circumscribes the output shaft extension 18$_A$. A first torque transfer device 42 selectively interconnects the carrier 38 to the output shaft extension 18$_A$, and thus also to the output shaft 18. The first planetary gear set 14 is thereby selectively connected to the output shaft 18.

The output shaft 18 is also directly connected to an outer gear member 44, also generally designated a ring gear, of the second planetary gear set 16. The outer gear member 44 circumscribes an inner gear member 46, also designated as a sun gear. A plurality of planet gear members 48 are rotatably mounted on a carrier 50 such that each planet gear member 48 meshingly engages both the outer gear member 44 and the inner gear member 46. The inner gear member 46 of the second planetary gear set 16 may, as shown, also be connected to the sleeve shaft 40 so that the inner gear members 34 and 46 of the respective planetary gear sets 14 and 16 are continuously conjoined. The carrier 50 of the second planetary gear set 16 is selectively connected to ground, designated as 52, by virtue of a second torque transfer device 54. By grounding the carrier 50 through the second torque transfer device 54, the planet gear members 48 may selectively serve as the reaction members for the second planetary gear set 16. As will become apparent, the second torque transfer device 54 effects a power transfer between one member in the first planetary gear set 14 and the output shaft 18.

The second motor/generator 22 is operatively, and simultaneously, connected to both the first and the second planetary gear sets 14 and 16. Specifically, a drive gear 56 is mounted on a connecting shaft 58 that drives, or is driven by, the second motor/generator 22. The drive gear 56 meshingly engages an output gear 60 that is secured to the sleeve shaft 40. Thus, through the sleeve shaft 40, the second motor/generator 22 is operatively connected to both inner gear members 34 and 46 of the respective first and second planetary gear sets 14 and 16.

The first motor/generator 20 is connected in a similar manner to the first planetary gear set 14. Specifically, a drive gear 62 is secured to a connecting shaft 64 that drives, or is driven by, the first motor/generator 20. The drive gear 62 meshingly engages a transfer gear 66 presented from the carrier 38 of the first planetary gear set 14.

A third torque transfer device 68 may be employed selectively to connect the input shaft 12 to the outer gear member 32 of the first planetary gear set 14. Although the torque transfer device 68 is selectively operable, it will be appreciated that a permanent connection could be made between the input shaft 12 and outer gear member 32 of the first planetary gear set 14 without departing from the spirit of the invention.

As is also represented in FIG. 2, the output shaft 18 drives, or is driven by, axles 70 and 72 through a differential 74. When the hybrid transmission 10 is used in a land vehicle each axle 70 and 72 terminates in a respective wheel 76 and 78.

Operation of the Exemplary Preferred Embodiment

Introduction

The operator of the vehicle has three primary devices to control the hybrid transmission 10. One of the primary control devices is a well known drive range selector (not shown) that directs the ECU 28 to configure the transmission for either the park, reverse, neutral, or forward drive range. The second and third primary control devices constitute an accelerator pedal (not shown) and a brake pedal (also not shown). The information obtained by the ECU 28 from these three primary control sources will hereinafter be referred to as the "operator demand". The ECU 28 also obtains information from both the first and second motor/generators 20 and 22, respectively, the engine 24 and the electric storage device 26. In response to an operator's action, the ECU 28 determines what is required and then manipulates the selectively operated components of the hybrid transmission 10 appropriately to respond to the operator demand.

For example, in the exemplary embodiment shown in FIG. 2, when the operator selects a drive range and manipulates either the accelerator pedal or the brake pedal, the ECU 28 thereby determines if the vehicle should accelerate or decelerate. The ECU 28 also monitors the state of the power sources, and determines the output speed from the transmission required to effect the desired rate of acceleration or deceleration. Under the direction of the ECU 28, the transmission is capable of providing a range of output speeds from slow to fast in order to meet the acceleration and deceleration demands.

In order to provide a full explanation as to the operation of a transmission embodying the concepts of the present invention, a description of the operational modes employed to achieve the output speeds necessary to meet the operator demand under various operating conditions shall be provided with respect to the first of the preferred embodiments. Those operating conditions are: whether the vehicle is to accelerate to, or hold, a desired speed; whether the vehicle is to decelerate; whether the engine is, or is not, operating; whether either of the motor/generators are to serve as either a motor or a generator; or, whether the electric storage devices are, or are not, to be charged. As such, the ECU 28 constantly reads the operator demand in conjunction with the other information that expresses the operational state of the vehicle, including the power sources, and responds accordingly. The following descriptions describe various operational states of the particular hybrid transmission identified by the numeral 10. Once the overall concept as to how this preferred embodiment operates is understood, those concepts shall likewise apply to the several alternative embodiments subsequently described herein.

As will become apparent as the detailed description proceeds, the hybrid transmission 10 is a two-mode, input-split, parallel, hybrid transmission. In other words, the output shaft 18 receives and provides power through two distinct gear trains within the transmission 10. A first mode or gear train exists when the output shaft 18 is driven by the outer gear member 44 of the second planetary gear set 16, as occurs when the second torque transfer device 54 is applied. A second mode or gear train exists when the output shaft 18 is driven by the first planetary gear set 14 when the first torque transfer device 42 is applied. Of course, it is also possible to have the first and second torque transfer devices 42 and 54 simultaneously applied so that power is received and provided at both distinct points of the output shaft 18.

Those skilled in the art will appreciate that each of these two modes or gear trains can be configured with the ECU 28 to provide a range of output speeds from relatively slow to relatively fast within each mode of operation. This combination of two modes with a slow to fast output speed range in each mode allows the transmission 10 to propel a vehicle from a stopped condition to highway speeds and meet the other objects of the invention. Additionally, the ECU 28 coordinates operation of the transmission 10 so as to allow synchronized shifts between the modes.

I. Acceleration: Electric storage device is the sole source of driving power; The engine is off In the operating condition defined by having electric storage device 26 be the sole source of the driving power, and when the ECU 28 has determined that the operator desires to accelerate to or maintain a desired vehicle speed, the ECU 28 simultaneously employs the first and second modes to effect slow output speeds and thereafter transfers to a second mode to provide the fast output speed.

To operate simultaneously in both the first and second modes and to provide slow output speed under this operating condition, the ECU directs the engagement or application of both the first and second torque transfer devices 42 and 54, respectively, while directing that a third torque transfer device 68 remains disengaged or released. Applying both the first and second torque transfer devices 42 and 54 effects simultaneous operation in both the first and second modes. The ECU 28 also directs both the motor/generators 20 and 22, respectively, to operate as motors and directs electrical power necessary for the motor/generators 20 and 22 to operate in that manner.

As such, power flows from the first motor/generator 20 through to the first planetary gear set 14, to the output shaft extension $18_A$ by the application of the torque transfer device 42. Power also flows from the first motor/generator 22 through the second planetary gear set 16 to the output shaft 18 by the application of the second torque transfer device 54.

An increase to the fast output speed—when the electric storage device 26 serves as the sole source of driving power—is achieved by operating in the second mode. To effect operation in the second mode, the ECU 28 directs that the first torque transfer device 42 be engaged or applied, that the second torque transfer device 54 be disengaged or released, and that the third torque transfer device 68 be engaged or applied.

The ECU 28 also directs both the first and second motor/generators 20 and 22 to act as motors and directs power from the electric storage device 26 to the first motor/generator 20 to apply power through the first planetary gear set 14 and the first torque transfer device 42 to the output shaft extension $18_A$.

It will be appreciated that this method of powering the vehicle solely by electrical energy is especially useful when quiet or stealth operation is desired or required.

II. Acceleration: The engine provides the sole source of driving power

In the operating condition defined by the engine 24 being the sole source of power and the ECU 28 has determined that the operator desires to accelerate to or maintain a desired vehicle speed, the ECU 28 employs the first mode to provide the lower portion of the slow output speed range and the second mode to provide the upper portion of the slow output speed range. The ECU 28 also employs the second mode to provide the fast output speed range.

For the initial, lower portion of the slow output speed range supplied by the first mode, the ECU 28 directs the engagement or application of both the second and third torque transfer devices 54 and 68, respectively, while directing that the first torque transfer device 42 remain disengaged, or released.

As such, the input shaft 12 connects to the outer gear member 32 of the first planetary gear set 14 through torque transfer device 68. At the same time, actuation of the second torque transfer device 54 secures the carrier 50 against rotation so that the rolling resistance imparted to the wheels 76 and 78 is reflected through the second planetary gear set 16 and along the sleeve shaft 40 to the inner gear member 34 of the first planetary gear set 14. That resistance to rotation of the inner gear member 34 serves to split the power input from the engine 24. Accordingly, the carrier 38 in the first planetary gear set 14 drives the first motor/generator 20 as a generator. The resulting electrical output from the first motor/generator 20 drives the second motor/generator 22 as a motor. The resulting output power from the second motor/generator 22 combines with the split input power from the engine 24 applied to the inner gear member 34 of the first planetary gear set 14 to drive the sleeve shaft 40.

The combined input power to the sleeve shaft 40 drives the inner gear member 46 of the second planetary gear set 16 to rotate the outer gear member 44 against the reaction of the fixed carrier 50. The outer member 44 of the second planetary gear set 16 drives the output shaft 18 to rotate the wheels 76 and 78.

To effect transition of the output speed from the lower portion of the slow output speed range to the upper portion of the slow output speed range, the second mode will be selected by the ECU 28. To select operation in the second mode, the ECU 28 directs that the first torque transfer device 42 be engaged or applied, that the second torque transfer device 54 be disengaged or released, and that the third torque transfer device 68 remain engaged or applied. As such, operation of the engine 24 effects rotation of the outer gear member 32 in the first planetary gear set 14. This occurs because the input shaft 12 is operatively connected to the outer gear member 32 through the third torque transfer device 68.

With the first torque transfer device 42 actuated, the input power from the engine 24 is split, with a portion of the input power driving the carrier 38 against the rolling resistance that is imparted to the wheels 76 and 78 (which is transmitted back through the output extension 18$_A$ and the first torque transfer device 42). That resistance to rotation of the carrier 38 causes the planet gears 36 to serve as reaction members and thereby directs a part of the input power from the engine 24 against the inner gear member 34 of the first planetary gear set 14 to rotate the sleeve shaft 40. Such rotation of the sleeve shaft 40 rotates the output drive gear 60 which meshingly engages the drive gear 56 so that the second motor/generator 22 is operated as a generator. The resulting electrical energy from the second motor/generator 22 is directed by the CPU 28 to drive the first motor/generator 20 as a motor, thereby enhancing rotation of the carrier 38 to assist in rotation of the output shaft extension 18$_A$. The aforesaid output power of the first motor/generator 20 is transmitted into the carrier 38 by the meshing engagement of the drive gear 62 with the transfer gear 66.

As the output speed continues to increase, the ECU 28 selects the faster output speed that can also be achieved when operating in the second mode. To operate in this output speed range with the engine 24 supplying the sole power to propel the vehicle, no change is effected to the status of any of the three torque transfer devices. However, the ECU 28 directs not only that the first motor/generator 20 operate as a generator and the second motor/generator operate as a motor but also that the electrical power generated by the first motor/generator 20 be directed to the second motor/generator 22.

Under these conditions, power is received from the engine 24 by the input shaft 12. The engine power is routed through the third torque transfer device 68 to the outer gear member 32 of the first planetary gear set 14. The first planetary gear set 14 transfers part of the power to the first motor/generator 20, which acts as a generator. The ECU 28 transfers the resulting electrical energy to the second motor/generator 22, which acts as a motor to rotate sleeve shaft 40 and thereby apply additional power to the carrier 38 in the first planetary gear set 14. The combined power applied to the carrier 38 transmits power through the torque transfer device 42 to the output shaft extension 18A and thus the output shaft 18.

It will be appreciated that this method of operation is especially useful when the charge level of the electrical storage device 26 is low or when the vehicle is carrying a heavy load.

III: Acceleration: Both the engine and the electric storage devices provide the driving power In the operating condition defined by having both the engine 24 and the electric storage device 26 combine to provide the driving power, and when the ECU 28 has determined that the operator desires to accelerate to or maintain a desired vehicle speed, the ECU 28 employs the first mode to provide the lower portion of the slow output speed range and the second mode to provide the upper portion of the slow output speed range as well as the medium output speed and the fast output speed.

For the initial slow output speed supplied by the first mode, the ECU 28 directs the engagement or application of both the second and third torque transfer devices 54 and 68, respectively, while directing that the first torque transfer device 42 remain disengaged, or released.

As such, the power flows from the engine 24 to the input shaft 12 and from the input shaft 12 through torque transfer device 68 into the outer gear member 32 of the first planetary gear set 14. The power input from the engine 24 splits within the first planetary gear set 14. Specifically, a portion of the engine power applied to the outer gear member 32 of the first planetary gear set 14 is transferred from the planet gear members 36 into the carrier 38 so that transfer gear 66 can rotate the drive gear 62, thus operating the first motor/generator 20 as a generator. The output from the motor/generator 20 is directed through the ECU 28 to combine with the power supplied by the electric storage device 26 to operate the second motor/generator 22 as a motor. Serving as a motor, the engagement of the drive gear 56 driven by the second motor/generator 22 engages the output gear 60 to rotate the sleeve shaft 40. The sleeve shaft 40, in turn, rotates the inner gear member 46 of the second planetary gear set 16 against the planet gear members 48 on the carrier 50 that is grounded by virtue of the torque transfer device 54. Rotation of the planet gear members 48 thus effects rotation of the outer gear member 44 in the second planetary gear set 16 to drive the output shaft 18.

Another portion of the split input power from the engine 24 applied to the outer gear member 32 of the first planetary gear set 14 is transferred through the planet gear members 36 to the inner gear member 34 of the first planetary gear set 14, which also rotates the sleeve shaft 40, thereby combining the output power applied thereto so that rotation of the inner gear member 46 of the second planetary gear set 16 is enhanced as the outer gear member 44 drives the output shaft 18.

As the output speed increases, but still in the slow output speed range, the second mode will be selected by the ECU 28. To effect operation in the second mode, the ECU 28 directs that the first torque transfer device 42 be engaged or applied, that the second torque transfer device 54 be disengaged or released, and that the third torque transfer device 68 remain engaged or applied.

As such, the power continues to flow from the engine 24 to the input shaft 12 and from the shaft 12 through torque transfer device 68 into the outer gear member 32 of the first planetary gear set 14. The power input from the engine 24 also splits within the first planetary gear set 14. Specifically, a portion of the engine power applied to the outer gear member 32 of the first planetary gear set 14 is transferred from the planet gear members 36 into the carrier 38, and with the torque transfer device 42 applied, the carrier rotates the output shaft extension 18$_A$, and thereby the output shaft 18.

Another portion of the split input power from the engine 24 applied to the outer gear member 32 of the first planetary gear set 14 is transferred through the planet gear members 36 to the inner gear member 34 of the first planetary gear set 14, which also rotates the sleeve shaft 40, thereby rotating the output gear 60 which, in turn, rotates the drive gear 56 to drive motor/generator 22 such that it operates as a generator. The ECU 28 directs the output from the second motor/generator 22 to combine with the power output from the electric storage device 26 and drive the first motor/generator 20 as a motor. By that arrangement, the drive gear 62 rotates the transfer gear 66 to assist in rotating the carrier 38 in the first planetary gear set 14, and thereby recombining the previously split input power to drive the output shaft extension 18$_A$, and thereby the output shaft 18.

To effect continued operation in the second mode, and to achieve medium output speed, no change is made to the status of the torque transfer devices. However, the ECU 28 directs the first and second motor/generators 20 and 22 to function as motors and also directs power from the electric storage device 26 to each motor/generator 20 and 22.

As will become apparent, under these operating conditions, the first planetary gear set 14 receives input power from three different sources. Specifically, power continues to flow from the engine 24 to the input shaft 12 and from the shaft 12 through torque transfer device 68 into the outer gear member 32 of the first planetary gear set 14. The power input from the engine 24 applied to the outer gear member 32 of the first planetary gear set 14 is transferred from the planet gear members 36 to the planet gear members 36 mounted on carrier 38. As will be hereinafter explained, under this operating condition, the inner gear member will, relative to the outer gear member 32, be a reactive member. Hence, the input power from the engine 24 will be transferred from the carrier 38, through torque transfer device 42, to the output shaft extension 18$_A$.

With both the motor/generators 20 and 22 serving as motors, the first motor/generator 20 rotates the drive gear 62 to apply power through the transfer gear 66 into the carrier 38 of the first planetary gear set 14. Operating as a motor, the second motor/generator 22 drives the output gear 60 on the sleeve shaft 40 to rotate the inner gear member 34 of the first planetary gear set 14. This action establishes the inner gear member 34 as the reactive member relative to the outer gear member 32 and also adds to the output power that drives the carrier 38. Hence, the engine 24 and both motor/generators 20 and 22 combine to provide the output power applied to rotate the output shaft 18.

To achieve the fast output speed supplied by operating in the second mode under these operating conditions, no change is made to the status of the torque transfer devices— i.e.: the first and third torque transfer devices 42 and 68, respectively, remain applied, and the second torque transfer device 54 is disengaged. However, the ECU 26 directs the first motor/generator 20 to operate as a generator and the second motor/generator 22 to operate as a motor.

As such, power flows from the engine 24 to the input shaft 12 and from the shaft 12 through torque transfer device 68 into the outer gear member 32 of the first planetary gear set 14. The power input from the engine 24 splits within the first planetary gear set 14. Specifically, a portion of the engine power applied to the outer gear member 32 of the first planetary gear set 14 is transferred from the planet gear members 36 into the carrier 38 so that transfer gear 66 can rotate the drive gear 62, thus operating the first motor/ generator 20 as a generator. The output from the motor/ generator 20 is directed through the ECU 28 to combine with the power supplied by the electric storage device 26 to operate the second motor/generator 22 as a motor. Serving as a motor, the engagement of the drive gear 56 driven by the motor/generator 22 engages the output gear 60 to rotate the sleeve shaft 40. The sleeve shaft 40, in turn, rotates the inner gear member 34 of the first planetary gear set 14 against the planet gear members 36 on the carrier 38. The power supplied from the second motor/generator 22, through the inner gear member 34 of the first planetary gear set 14, combines with the power supplied by the engine 24, applied through the outer gear member 32 of the first planetary gear set 14, to rotate the carrier 38 on which the planet gear members 36 are supported. The combined output power rotates the output shaft extension 18$_A$, and thus the output shaft 18.

It will be appreciated that this method of obtaining the desired output speed is especially useful when the operator of the vehicle desires to travel at highway speed.

IV. Acceleration: The engine provides not only the driving power but also charges the electric storage device In the operating condition defined by having the engine 24 provide the driving power and at the same time charge the electric storage device 26, and when the ECU 28 has determined that the operator desires to accelerate to or maintain a desired vehicle speed, the ECU 28 employs the initial slow and medium output speed range available by operating in the first mode and thereafter the slow, medium and fast output speed ranges available from operating in the second mode. It should be understood that the slow output speed range provided by operating in the second mode is faster than the medium output speed range provided by operating in the first mode.

For the initial slow output speed supplied by the first mode, the ECU 28 directs the engagement or application of both the second and third torque transfer devices 54 and 68, respectively, while directing that the first torque transfer device 42 remain disengaged or released.

The ECU 28 also directs the first motor/generator 20 to function as a generator and the second motor/generator 22 to function as a motor and also directs appropriate power to and from the respective motor/generators.

As such, the power flows from the engine 24 to the input shaft 12 and from the shaft 12 through torque transfer device 68 into the outer gear member 32 of the first planetary gear set 14. The power input from the engine 24 splits within the first planetary gear set 14. Specifically, a portion of the engine power applied to the outer gear member 32 of the first planetary gear set 14 is transferred from the planet gear members 36 into the carrier 38 so that transfer gear 66 can rotate the drive gear 62, thus operating the first motor/ generator 20 as a generator.

The output from the motor/generator 20 is directed through the ECU 28 so that a portion of that power is used to charge the electric storage device 26 and the remainder of the power serves to operate the second motor/generator 22 as a motor. Operating as a motor, the drive gear 56 driven by the second motor/generator 22 engages the output gear 60 to rotate the sleeve shaft 40. The sleeve shaft 40, in turn, rotates the inner gear member 46 of the second planetary gear set 16 against the planet gear members 48 on the carrier 50 that is grounded by virtue of the torque transfer device 54. Rotation of the planet gear members 48 thus effects rotation of the outer gear member 44 in the second planetary gear set 16 to drive the output shaft 18.

Another portion of the split input power from the engine 24 applied to the outer gear member 32 of the first planetary gear set 14 is transferred through the planet gear members 36 to the inner gear member 34 of the first planetary gear set 14 such that the sleeve shaft 40 is rotated. In that way, the split power is recombined to drive the inner gear member 46 of the second planetary gear set 16 to drive the output shaft 18.

To achieve medium output speed by operating in the first mode under these operating conditions, the torque transfer devices remain unchanged. However, the ECU 28 directs both the first and second motor/generators 20 and 22 to operate as generators.

As such, the power flows from the engine 24 to the input shaft 12 and from the shaft 12 through torque transfer device 68 into the outer gear member 32 of the first planetary gear set 14. The power input from the engine 24 splits within the first planetary gear set 14. Specifically, a portion of the engine power applied to the outer gear member 32 of the first planetary gear set 14 is transferred from the planet gear members 36 into the carrier 38 so that transfer gear 66 can rotate the drive gear 62, thus operating the first motor/ generator 20 as a generator. The output from the motor/ generator 20 is directed through the ECU 28 to charge the electric storage device 26.

Another portion of the split input power from the engine 24 applied to the outer gear member 32 of the first planetary gear set 14 is transferred through the planet gear members 36 to the inner gear member 34 of the first planetary gear set 14, which also rotates the sleeve shaft 40. The sleeve shaft 40 rotates the output gear 60 which, in turn, rotates the drive gear 56, thereby operating the second motor/generator 22 such that it operates as a generator. The ECU 28 also directs the output from the second motor/generator 22 to charge the electric storage device 26.

To progress to the slow output speed provided by operation in the second mode, the ECU 28 directs: the engagement or application of the first torque transfer device 42; the disengagement of the second torque transfer device 54; and, maintains the third torque transfer device 68 in engagement.

The ECU 28 also directs the first motor/generator 20 to function as a motor and the second motor/generator 22 to function as a generator. As such, power continues to flow from the engine 24 to the input shaft 12 and from the shaft 12 through torque transfer device 68 into the outer gear member 32 of the first planetary gear set 14. The power input from the engine 24 also splits within the first planetary gear set 14. Specifically, a portion of the engine power applied to the outer gear member 32 of the first planetary gear set 14 is transferred from the planet gear members 36 into the carrier 38, and with the torque transfer device 42 applied, the carrier rotates the output shaft extension $18_A$, and thereby the output shaft 18.

Another portion of the split input power from the engine 24 applied to the outer gear member 32 of the first planetary gear set 14 is transferred through the planet gear members 36 to the inner gear member 34 of the first planetary gear set 14, which also rotates the sleeve shaft 40, thereby rotating the output gear 60 which, in turn, rotates the drive gear 56 to operate motor/generator 22 such that it operates as a generator. The ECU 28 directs the output from the second motor/generator 22 partially to charge the electric storage device 28 and partly to drive the first motor/generator 20 as a motor. Operating as a motor, the first motor/generator 20 causes the drive gear 62 to rotate the transfer gear 66 and thereby assist in rotating the carrier 38 in the first planetary gear set 14. This action recombines a portion of the previously split input power to drive the output shaft extension $18_A$, and thereby the output shaft 18.

To effect continued operation in the second mode, and to achieve medium output speed, the torque transfer devices remain unchanged. However, the ECU 28 directs both the first and second motor/generators 20 and 22 to operate as generators, and the electrical power from both the first and second motor/generators 20 and 22 is applied to charging the electric storage device 26.

Specifically, when operating under this condition, the power flows from the engine 24 to the input shaft 12 and from the shaft 12 through torque transfer device 68 into the outer gear member 32 of the first planetary gear set 14. The power input from the engine 24 splits three ways within the first planetary gear set 14.

One portion of the engine power applied to the outer gear member 32 of the first planetary gear set 14 is transferred from the planet gear members 36 into the carrier 38, and with the torque transfer device 42 applied, the carrier rotates the output shaft extension $18_A$, and thereby the output shaft 18.

A second portion of the engine power applied to the outer gear member 32 of the first planetary gear set 14 is transferred from the planet gear members 36 into the carrier 38 so that the transfer gear 66 can rotate the drive gear 62, thus operating the first motor/generator 20 as a generator. The output from the motor/generator 20 is directed through the ECU 28 to charge the electric storage device 26.

A third portion of the engine power applied to the outer gear member 32 of the first planetary gear set 14 is transferred from the planet gear members 36 to the inner gear member 34 of the first planetary gear set 14, which also rotates the sleeve shaft 40. The sleeve shaft 40 rotates the output gear 60 which, in turn, rotates the drive gear 56 to operate motor/generator 22 as a generator. The ECU 28 also directs the output from the second motor/generator 22 to charge the electric storage device 26.

To effect continued operation in the second mode, and to achieve fast output speed, the torque transfer devices remain unchanged—i.e.: the first and third torque transfer devices 42 and 68, respectively, remain applied, and the second torque transfer device 54 remains disengaged. However, the ECU 28 directs the first motor/generator 20 to operate as a generator and the second motor/generator 22 to operate as a motor.

As such, power flows from the engine 24 to the input shaft 12 and from the shaft 12 through torque transfer device 68 into the outer gear member 32 of the first planetary gear set 14. The power input from the engine 24 splits within the first planetary gear set 14. Specifically, a portion of the engine power applied to the outer gear member 32 of the first planetary gear set 14 is transferred from the planet gear members 36 into the carrier 38, and with the torque transfer device 42 applied, the carrier rotates the output shaft extension $18_A$, and thereby the output shaft 18.

Another portion of the engine power applied to the outer gear member 32 of the first planetary gear set 14 is transferred from the planet gear members 36 into the carrier 38 so that transfer gear 66 can rotate the drive gear 62, thus operating the first motor/generator 20 as a generator. The output from the motor/generator 20 is directed through the ECU 28 such that one portion serves to charge the electric storage device 26 and another portion operates the second motor/generator 22 as a motor. Serving as a motor, the engagement of the drive gear 56 driven by the second motor/generator 22 engages the output gear 60 to rotate the sleeve shaft 40. The sleeve shaft 40, in turn, rotates the inner gear member 34 of the first planetary gear set 14 against the planet gear members 36 on the carrier 38. The power from the second motor/generator 22, thus supplied through the inner gear member 34 of the first planetary gear set 14, combines with the power supplied by the engine 24, applied through the outer gear member 32 of the first planetary gear set 14, to rotate the carrier 38 on which the planet gear members 36 are supported. The combined output power not only assists in operating the first motor/generator 20 as a generator, but also assists in rotating the output shaft extension $18_A$, and thus the output shaft 18.

It will be appreciated that this method of operation is especially useful when battery charging is desired and the absolute maximum speed is not required.

V. Deceleration: The momentum of the vehicle is used to charge the electric storage device The engine is not running and is not absorbing any energy In the operating condition defined by having the momentum of the moving vehicle fed back solely for the purpose of charging the electric storage device 26 (with none of that energy being absorbed by the engine), and when the ECU 28 has determined that the operator desires to decelerate, the ECU 28 directs operation in both the first and the second modes when the feed-back speeds are in the slow feed-back speed range and directs that operation occur solely in the second mode when the feed-back speeds fall in the fast feed-back speed range.

For operation in both the first and second modes, the ECU 28 directs the engagement or application of both the first and the second torque transfer devices 42 and 54, respectively, while directing that the third torque transfer device 68 be disengaged or released. To effect the transition whereby the transmission 10 operates solely in the second mode, the ECU 28 simply effects disengagement of the second torque transfer device 54. As such, the first torque transfer device 42 remains engaged, and the third torque transfer device 68 remains disengaged.

Under the condition that both the first and second modes are simultaneously selected, feed-back power is received from the output shaft 18 and split into two paths. One path of the feed-back power rotates the output shaft extension 18$_A$, which—because the first torque transfer device 42 is applied—feeds power through the carrier 38 of the first planetary gear set 14 to drive the transfer gear 66. The transfer gear 66 rotates the drive gear 62 to operate the motor/generator 20 as a generator. Power from the first motor/generator 20 is directed through the ECU 28 to charge the electric storage device 26.

The other path for the feed-back power supplied through the output shaft 18 rotates the outer gear member 44 in the second planetary gear set 16, and—because the second torque transfer device 54 is applied—the carrier 50 in the second planetary gear set 16 is grounded. Accordingly, rotation of the outer gear member 44 merely rotates the planet gear members 48 which, in turn, rotate the inner gear member 46, and thereby the sleeve shaft 40. Inasmuch as there is no reaction member in the first planetary gear set 14, that planetary gear set allows the sleeve shaft 40 to rotate freely. Hence, rotation of the sleeve shaft causes the output gear 60 to rotate the drive gear 56 and operate the second motor/generator 22 as a generator. The power from the second motor/generator 22 is also directed by the ECU 28, to charge the electric storage device 26.

When decelerating is occurring from higher vehicular speeds, the ECU 28 directs that only the first torque transfer device 42 be applied. Both the second and the third torque transfer devices 54 and 68, respectively, are not activated. The ECU also directs that only the first motor/generator 20 serves as a generator to direct power through the ECU 28 to charge the electric storage device 26. The second motor/generator 22 is inoperative, and the engine 24 is not running.

As such, feed-back power is received from the output shaft 18 to rotate the output shaft extension 18$_A$, which—because the first torque transfer device 42 is applied—feeds power through the carrier 38 of the first planetary gear set 14 to drive the transfer gear 66. The transfer gear 66 rotates the drive gear 62 to operate the first motor/generator 20 as a generator. Power from the first motor/generator 20 is directed through the ECU 28 to charge the electric storage device 26.

It will be appreciated that this method of deceleration is especially useful when it is desired to eliminate any emissions from the engine 24 or when quiet or stealth operation is desired.

VI. Deceleration: The momentum of the vehicle is absorbed by the engine none of the energy is used to charge the electric storage device In the operating condition defined by having the momentum of the moving vehicle fed back to the engine solely for the purpose of absorbing energy (with none of that energy being used to charge the electric storage device 26), and when the ECU 28 has determined that the operator desires to decelerate, the ECU 28 directs operation in the first mode when the feed-back speeds are in the slow feed-back speed range accommodated by that mode and directs that operation occur in the second mode when the feed-back speeds fall between the slow feed-back speed range and the fast feed-back speed range accommodated by that mode.

For operation in the first mode, when feed-back speeds are in the slow feed-back speed range, the ECU 28 directs the engagement or application of the second and third torque transfer devices 54 and 68, respectively, while directing that the first torque transfer device 42 be or remain disengaged.

To achieve the desired results for the operating condition defined, the ECU 28 not only directs that the first motor/generator 20 function as a motor and that the second motor/generator 22 function as a generator but also directs the power from the second motor/generator 22 be applied to the first motor/generator 20. Feed-back power received from the output shaft 18 is transmitted to the outer gear member 44 of the second planetary gear set 16, and—because the carrier 50 is grounded through the second torque transfer device 54—rotation of the outer gear member 44 rotates the planet gears 48 and the inner gear member 46 of the second planetary gear set 16. The resulting rotation of the inner gear member 46 rotates sleeve shaft 40 so as to provide two paths for the flow of the feed-back power.

One path for the feed-back power supplied through the output shaft 18 rotates the outer gear member 44 in the second planetary gear set 16, and—because the second torque transfer device 54 is applied—the carrier 50 in the second planetary gear set 16 is grounded. Accordingly, rotation of the outer gear member 44 merely rotates the planet gear members 48 which, in turn, rotate the inner gear member 46, and thereby the sleeve shaft 40. Rotation of the sleeve shaft 40 causes the output gear 60 to rotate the drive gear 56 and operate the second motor/generator 22 as a generator.

The power produced by the second motor/generator 22 is also directed by the ECU 28, to drive the motor/generator 20 as a motor. The drive gear 62 is thus rotated to drive the transfer gear 66, which rotates the carrier 38 in the first planetary gear set 14. Because the inner gear member 34 acts as the reaction member, for a mason that will hereinafter be described, rotation of the carrier 38 by the first motor/generator 20 will effect rotation of the outer gear member 32 of the first planetary gear set 14. With the third torque transfer device 68 applied, rotation of the outer gear member will transmit the power applied by the first motor/generator 20 through the input shaft 12 to the engine 24.

The second path applies the feed-back power from the sleeve shaft 40 to the inner gear member 34 of the first planetary gear set 14, thus rotating that gear member against the free rotation of the planet gears 36 on the carrier 38 in the first planetary gear set 14. This path not only causes the inner gear member 34 to serve as the reaction member to the force applied to the first planetary gear set 14 by the motor/generator 20, but also allows the additional force transmitted to the inner gear member 34 by the sleeve shaft 40 to be fed to the outer gear member 32 and through the third torque transfer device 68 to the input shaft 12 and into the engine 24.

For operation in the second mode when the engine 24 is to absorb feed-back power from deceleration occurring in the slow feed-back speed range accommodated by that mode, the first torque transfer device 42 is applied, the second torque transfer device is de-activated and the third torque transfer device remains applied.

The ECU 28 also reverses the functions of the motor/generators such that motor/generator 20 functions as a generator, and the motor/generator 22 functions as a motor. Even so, all the feed-back power from the output shaft 18 is applied against the engine 24, which effects braking.

Specifically, when operating under this condition, the feed-back power flows from the output shaft 18 into the output shaft extension $18_A$. Because the first torque transfer device 42 is applied, feed-back power from the output shaft extension $18_A$ is applied to the carrier 38 in the first planetary gear set 14. The resulting rotation of the carrier 38 causes the transfer gear 66 secured to the carrier 38 to rotate the drive gear 62 such that the first motor/generator 20 acts as a generator. The output power from motor/generator 20 is directed by the ECU 28 to drive the second motor/generator 22 as a motor. The drive gear 56 thus rotates the output gear 60 and the attached sleeve shaft 40. Rotation of the sleeve shaft 40, in turn, rotates the inner gear member 34 of the first planetary gear set 14 to drive the planet gears 36 relative to the carrier 38 and thereby combine the feed-back power that is fed to the outer gear member 32, through the third torque transfer device 68 and into the input shaft 12 so that it can be absorbed by the engine 24.

For operation in the second mode when the engine 24 is to absorb feed-back power from deceleration occurring in the fast feed-back speed range accommodated by that mode, the status of the torque transfer devices remains the same—i.e.: first and third torque transfer device 42 and 68, respectively, remain applied, and the second torque transfer device 54 remains de-activated.

The ECU 28 reverses the functions of the motor/generators once again such that the first motor/generator 20 functions as a motor and the second motor/generator 22 functions as a generator. Even so, all the feed-back power from the output shaft 18 is applied against the engine 24, which effects braking.

When operating under this condition, the feed-back power flows from the output shaft 18 into the output shaft extension $18_A$. Because the first torque transfer device 42 is applied, feed-back power from the output shaft extension $18_A$ is applied to the carrier 38 in the first planetary gear set 14. The resulting rotation of the carrier 38 causes the feed-back power to split.

One path of the feed-back power rotates the inner gear member 34 of the first planetary gear set 14 and the sleeve shaft 40 attached thereto. The output gear 60 rotates in conjunction with the sleeve shaft 40 to drive the transfer gear 56, thus causing the second motor/generator 22 to act as a generator. The power from the second motor/generator 22 is fed by the ECU 28 to the first motor/generator 20, which acts as a motor. The first motor/generator 20 thus applies additional power to rotate the carrier 38 of the first planetary gear set 14 which thereby combines the feed-back power that is fed to the outer gear member 32, through the third torque transfer device 68 and into the input shaft 12 so that it can be absorbed by the engine 24.

It will be appreciated that this method of deceleration is especially useful for absorbing feed-back power by the engine 24 when charging of the electric storage device 26 is not required.

VII. Deceleration: The vehicle momentum is partially employed to charge the electric storage device and iS partially absorbed by the engine In the operating condition defined by having a portion of the energy generated by the momentum of the moving vehicle fed back to charge the electric storage device 26 and the remainder being absorbed by the engine 24, and when the ECU 28 has determined that the operator desires to decelerate, the ECU 28 directs operation in the first mode when the feed-back speeds are in the slow feed-back speed range accommodated by that mode and directs that operation occur in the second mode when the feed-back speed range falls between the slow feed-back speed range and the fast feed-back speed range accommodated by operation in that mode.

For operation in the first mode when feed-back speeds are in the slow range accommodated by that mode, the ECU 28 directs the engagement or application of both the second and third torque transfer devices 54 and 68, respectively, while directing that the first torque transfer device 42 be or remain disengaged.

The ECU 28 also directs that the first motor/generator 20 function as a motor and that the second motor/generator 22 function as a generator while directing that the power from the second motor/generator 22 be applied, in part, to the first motor/generator 20 and, in part, to charge the electric storage device 26.

Feed-back power received from the output shaft 18 is transmitted to the outer gear member 44 of the second planetary gear set 16, and—because the carrier 50 is grounded through the second torque transfer device 54—rotation of the outer gear member 44 rotates the planet gears 48 and the inner gear member 46 of the second planetary gear set 16. The resulting rotation of the inner gear member 46 rotates sleeve shaft 40 so as to provide two paths for the flow of the feed-back power.

One path for the feed-back power supplied through the output shaft 18, which rotates the sleeve shaft 40, causes the output gear 60 secured to the sleeve shaft 40 to rotate the drive gear 56 and operate the motor/generator 22 as a generator. A portion of the power produced by the second motor/generator 22 is directed by the ECU 28, to charge the electric storage device 26 and the remainder of the power drives the motor/generator 20 as a motor. The drive gear 62 is thus rotated to drive the transfer gear 66, which rotates the carrier 38 in the first planetary gear set 14. Because the inner gear member 34 acts as the reaction member, for a reason that will hereinafter be described, rotation of the carrier 38 by the first motor/generator 20 will effect rotation of the outer gear member 32 of the first planetary gear set 14. With the third torque transfer device 68 applied, rotation of the outer gear member 32 will transmit the power applied by the first motor/generator 20 through the input shaft 12 to the engine 24.

The second path applies the feed-back power from the sleeve shaft 40 to the inner gear member 34 of the first planetary gear set 14, thus rotating that gear member against the free rotation of the planet gears 36 on the carrier 38 in the first planetary gear set 14. This path not only causes the inner gear member 34 to serve as the reaction member to the force applied to the first planetary gear set 14 by the motor/generator 20, but also allows the additional force transmitted to the inner gear member 34 by the sleeve shaft 40 to be fed to the outer gear member 32 and from gear member 32 through the third torque transfer device 68 and into the input shaft 12 so that it can be absorbed by the engine 24.

For operation in the second mode when feed-back speeds are in the slow speed range accommodated by that mode, the ECU 28 directs that the first torque transfer device 42 be applied, the second torque transfer device be de-activated and the third torque transfer device remains applied.

The ECU 28 also directs the first motor/generator 20 to function as a generator and directs a portion of that power to charge the electric storage device 26. The ECU 28 directs the remainder of that power to the second motor/generator 22, which acts as a motor. A portion of the feed-back power from the output shaft 18 is thus applied to charge the electric storage device 26, and the reminder is applied, through the planetary gear set 14, against the engine 24, which effects braking.

Specifically, when operating under this condition, the feed-back power flows from the output shaft 18 into the output shaft extension $18_A$. Because the first torque transfer device 42 is applied, feed-back power from the output shaft extension $18_A$ is applied to the carrier 38 in the first planetary gear set 14. The resulting rotation of the carrier 38 causes the transfer gear 66 secured to the carrier 38 to rotate the drive gear 62 such that the first motor/generator 20 acts as a generator. A portion of the output power from motor/generator 20 is directed by the ECU 28, to charge the electric storage device 26, and the remainder of the power from the motor/generator 20 is directed to drive the second motor/generator 22 as a motor. The drive gear 56 thus rotates the output gear 60 and the attached sleeve shaft 40. Rotation of the sleeve shaft 40, in turn, rotates the inner gear member 34 of the first planetary gear set 14 to drive the planet gears 36 relative to the carrier 38 and thereby combine that portion of the feed-back power which is not utilized to charge the electric storage device 26 but which is fed to the outer gear member 32, to be transmitted through the third torque transfer device 68 and into the input shaft 12 so that it can be absorbed by the engine 24.

For operation in the second mode when feed-back speeds engendered by vehicular momentum fall within the medium speed range accommodated by that mode, the ECU 28 directs that the first and third torque transfer devices 42 and 68 continue to remain applied, and that the second torque transfer device 54 remains de-activated. However, the ECU 28 also directs that the function of the second motor/generator 22 be reversed such that it also operates as a generator.

The ECU 28 thus receives electrical power from both the first and second motor/generators 20 and 22 and directs the entire amount of that power to charge the electric storage device 26. Any excess feed-back power is applied, through the planetary gear set 14, against the engine 24, which effects braking.

Specifically, when operating under this condition, the feed-back power flows from the output shaft 18 into the output shaft extension $18_A$. Because the first torque transfer device 42 is applied, feed-back power from the output shaft extension $18_A$ is applied to the carrier 38 in the first planetary gear set 14. Because the third torque transfer device 68 is applied, operation of the engine 24 causes the outer gear member 32 of the first planetary gear set 14 to serve as the reaction member. As such, a portion of the feed-back power is split to rotate the carrier 38 and a portion rotates the inner gear member 34. Rotation of the carrier 38 drives—by virtue of the meshing engagement of the transfer gear 66 with the drive gear 62—the first motor/generator 20 as a generator, and that power is directed by the ECU 28 to charge the electric storage device 26.

Similarly, rotation of the inner gear member 34 drives—by virtue of the meshing engagement of the output gear 66 (that is supported in the sleeve shaft 40 with the inner gear member 34) with the transfer gear 62—the motor/generator 22 as a generator, and that power is also directed by the ECU 28 to charge the electric storage device 26. Excess feed-back power applied against the outer gear member 32 of the first planetary gear set 14 by rotation of the carrier 38 is transmitted through the third torque transfer device 68 and into the input shaft 12 so that it can be absorbed by the engine 24.

For operation in the second mode when feed-back speeds engendered by vehicular momentum are within the fast range accommodated by that mode, the ECU 28 directs that the first and third torque transfer devices 42 and 68 continue to remain applied, and that the second torque transfer device 54 also remains de-activated. However, the ECU 28 also directs that the function of the first motor/generator 20 be reversed once again such that it operates as a motor.

The ECU 28 receives power from the second motor/generators 22, which operates as a generator, and directs that a portion of the power so generated be used to charge the electric storage device 26 and that the remainder be used to drive the motor/generator 20, which is now functioning as a motor, such that excess feed-back power is applied against the engine 24, through the planetary gear set 14, which effects braking.

Specifically, when operating under this condition, the feed-back power flows from the output shaft 18 into the output shaft extension $18_A$. Because the first torque transfer device 42 is applied, feed-back power from the output shaft extension $18_A$ is applied to the carrier 38 in the first planetary gear set 14. Because the third torque transfer device 68 is applied, operation of the engine 24 causes the outer gear member 32 of the first planetary gear set 14 to serve as the reaction member. As such, a portion of the feed-back power is split to counteract the reactive force applied to the outer gear member 32 by the engine 24, and the remainder of the power is applied to rotate the inner gear member 34.

Rotation of the inner gear member 34 drives—by virtue of the meshing engagement of the output gear 66 (that is supported in the sleeve shaft 40 with the inner gear member 34) with the transfer gear 62—the motor/generator 22 as a generator, and a portion of that power is directed by the ECU 28 to charge the electric storage device 26. The remainder of the power from motor/generator 22 is directed by the ECU 28 to drive the first motor/generator 20 as a motor. As a motor, the motor/generator 20 rotates the drive gear 62 and the transfer gear 66, which rotates the carrier 38 in the first planetary gear set 14. Rotation of the carrier 38 by the first motor/generator 20 will combine with previously described application of power to the outer gear member 32 by the carrier 38 to act against the power applied thereto by the engine 24 such that the excess feed-back power applied against the outer gear member 32 of the first planetary gear set 14 by rotation of the carrier 38 is transmitted through the third torque transfer device 68 and into the input shaft 12 so that it can be absorbed by the engine 24.

It will be appreciated that this method of deceleration is especially useful when the electric storage device 26 requires charging and when it is desired to employ the engine to absorb energy created by the momentum of the vehicle.

Description of a First Alternative Embodiment

Figure 3:
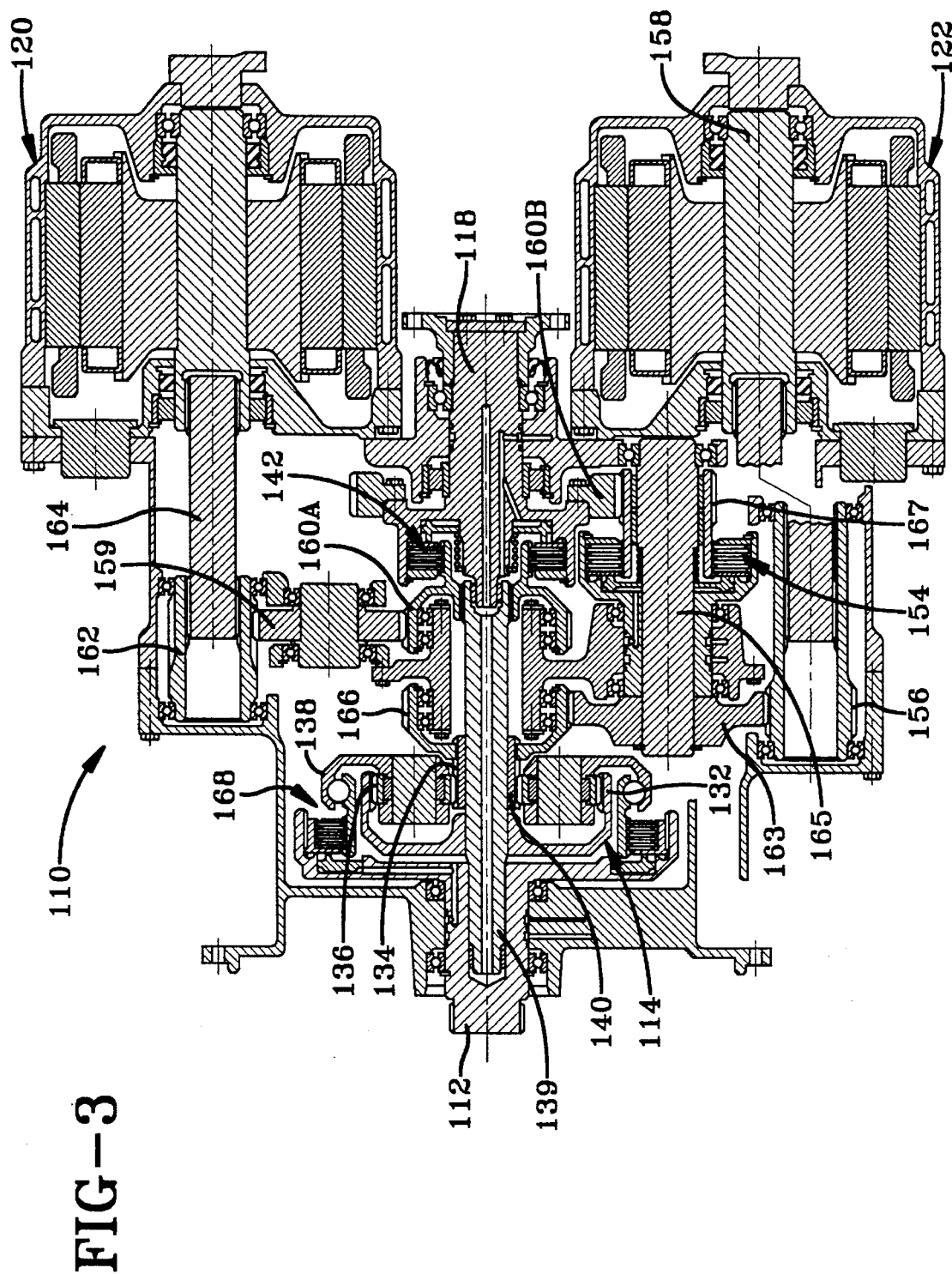
FIG. 3 is a diagrammatic, longitudinal cross section through a second representative, and also preferred, embodiment of a hybrid transmission embodying)the concepts of the present invention.
Figure 4:
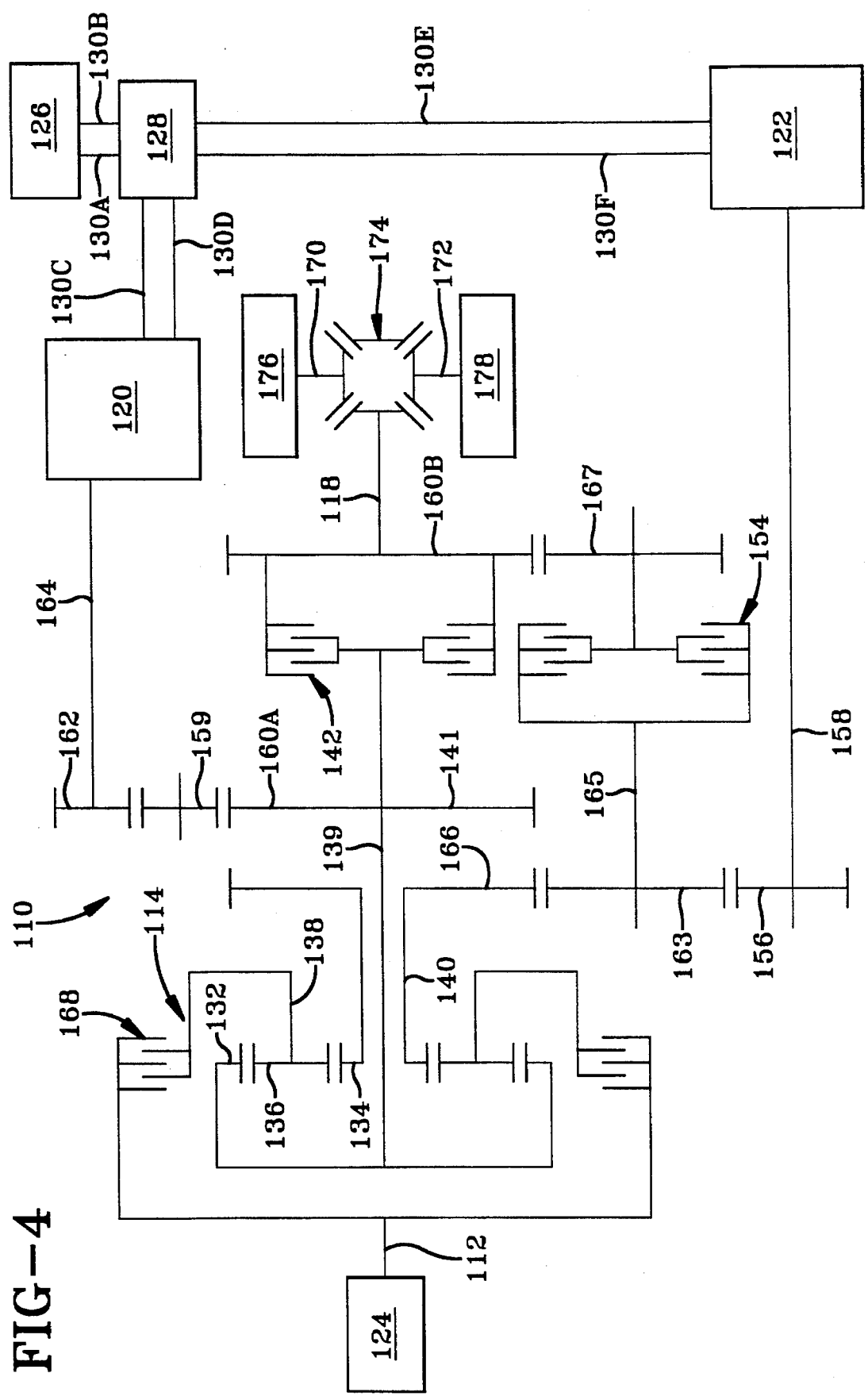
FIG. 4 is a schematic representation of the hybrid transmission depicted in FIG. 3.

A first alternative and also a highly preferred form of a hybrid transmission embodying the concepts of the present invention, is designated generally by the numeral 110 on FIGS. 3 and 4. With particular reference to FIG. 4, it will be observed that the transmission 110 has an input shaft 112, at least a first planetary gear set 114 and an output shaft 118. The transmission 110 also has first and second motor/generators 120 and 122, respectively, which are both continuously connected with the first planetary gear set 114 and selectively connected to the output shaft 118.

The hybrid transmission 110 is utilized in a vehicle (not shown), such as a bus or armored vehicle, that is driven by an operator. The transmission 110 selectively receives power from an engine 124 and an electric storage device 126. The hybrid transmission 110 can, as will be hereinafter more fully discussed, also receive feed-back power from the vehicle axles when the vehicle is decelerating. In this exemplary embodiment, the engine 124 may be a fossil fuel engine, and the electric storage device 126 may be one or more batteries. It will be noted that other electric storage devices which have the ability to store electric power and dispense electric power may be used in place of the batteries without altering the concepts of the present invention. The electric storage device 126 communicates with an electrical control unit (ECU) 128 by transfer conductors 130A and 130B. The ECU 128 communicates with the first motor/generator 120 by transfer conductors 130C and 130D, and the ECU 128 similarly communicates with the second motor/generator 122 by transfer conductors 130E and 130F.

Power from the engine 124 is, as will be hereinafter more fully explained, selectively introduced into a planetary gear set 114 in the hybrid transmission 110. The first planetary gear set 114 has an outer gear member 132, generally designated as a ring gear, which circumscribes an inner gear member 134, generally designated as the sun gear. A plurality of planet gear members 136 are rotatably mounted on a carrier 138 such that each planet gear member 136 meshingly engages both the outer gear member 132 and the inner gear member 134.

The outer gear member 132 is connected to a transfer shaft 139 which extends axially within a sleeve shaft 140. The transfer shaft 139 terminates in a first torque transfer device 142 which permits selective connection between the transfer shaft 139 and the output shaft 118.

The first motor/generator 120 is continuously connected to the first planetary gear set 114 and, conjointly with the first planetary gear set 114, selectively connected to the output shaft 118. Specifically, a drive gear 162 is mounted on a connecting shaft 164 that drives, or is driven by, the first motor/generator 120. The drive gear 162 meshingly engages an idler gear 159 which also meshingly engages a first output gear 160A that is secured to the transfer shaft 139.

The second motor/generator 122 is also continuously connected to the first planetary gear set 114 and, conjointly with the first planetary gear set 114, selectively connected to the output shaft 118. Specifically, a drive gear 156 is secured to a connecting shaft 158 that drives, or is driven by, the second motor/generator 122. The drive gear 156 meshingly engages a take-off gear 163 which also meshingly engages a transfer gear 166 presented from the sleeve shaft 140 that is continuously secured to the inner gear member 134 of the first planetary gear set 114.

The take-off gear 163 is connected, as by a shaft 165, to a second torque transfer device 154 which selectively connects the take-off gear 163 to drive gear 167 that meshingly engages a second output gear 160B that is presented from the output shaft 118. As such, the second torque transfer device 154 also serves to effect a power transfer between the first planetary gear set 114 and the output shaft 118.

The carrier 138 in the first planetary gear set 114 is preferably connected to the input shaft 112 by a third torque transfer device 168.

As is also represented in FIG. 4, the output shaft 118 drives, or is driven by, axles 170 and 172 through a differential 174. When the hybrid transmission 110 is used in a land vehicle, each axle 170 and 172 terminates in a respective wheel 176 and 178.

In this embodiment, as well, the operator requests certain types of performance from the vehicle depending upon given situations. These different levels of performance include but are not limited to: direction of travel, acceleration, deceleration, coasting and battery charging. The ECU 128 receives and interprets the operator input and uses the input to control the power flow going into and out of the electrical storage device 126 and the first and second motor/generators 120 and 122. The ECU 128 is also capable of monitoring the power flow of the engine 124, vehicle speed, operator demand, and the level to which the storage device 126 is charged. The ECU 128 is capable of selectively controlling the operational function of the engine 124, the electrical storage device 126, and the first and second motor/generators 120 and 122, respectively. As such, power can be generated, stored or transferred between the various power supply devices. Therefore, the ECU 128 ensures maximum efficiency of the transmission 110 while providing maximum power output.

It will be appreciated that torque from the engine 124 rotates the input shaft 112 to transmit torque to the carrier 138 of the first planetary gear set 114. Conversely, feed-back power from the output shaft 118 may be absorbed back into the engine 124 through the input shaft 112. When energy generated by the momentum of the vehicle is absorbed back into the engine 124, the engine 124 functions as a damper. This situation occurs, for example, when the vehicle is decelerating.

Description of a Second Alternative Embodiment

Figure 5:
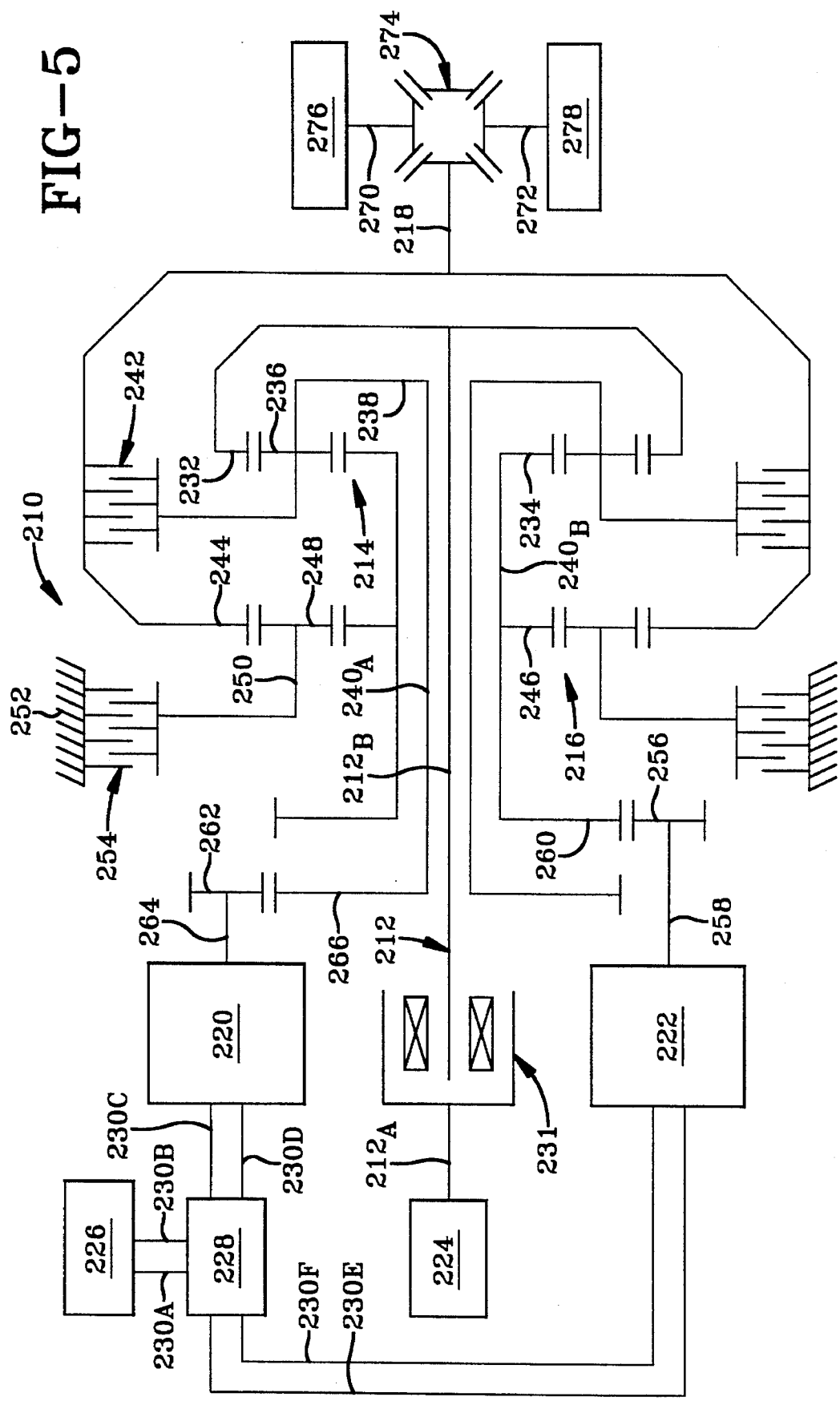
FIG. 5 is a schematic representation, similar to FIGS. 2 and 4, of a second alternative embodiment of a hybrid transmission embodying the concepts of the present invention.

A second alternative form of a hybrid transmission embodying the concepts of the present invention is designated generally by the numeral 210 on FIG. 5. In particular, FIG. 5 shows that the transmission 210 has an input shaft 212, first and second planetary gears 214 and 216, respectively, and an output shaft 218. The transmission 210 also has first and second motor/generators 220 and 222, respectively, which are operatively connected with the first and second planetary gears 214 and 216, respectively.

The hybrid transmission 210 is utilized in a vehicle (not shown), such as a bus or armored vehicle, that is driven by an operator. The transmission 210 selectively receives power from an engine 224 and an electric storage device 226. The hybrid transmission 210 can, as will be hereinafter more fully discussed, also receive feed-back power from the vehicle axles when the vehicle is decelerating. In this exemplary embodiment, the engine 224 may be a fossil fuel engine, and the electric storage device 226 may be one or more batteries. It will be noted that other electric storage devices which have the ability to store electric power and dispense electric power may be used in place of the batteries without altering the concepts of the present invention. The electric storage device 226 communicates with an electrical control unit (ECU) 228 by transfer conductors 230A and 230B. The ECU 228 communicates with the first motor/generator 220 by transfer conductors 230C and 230D, and the ECU 228 similarly communicates with the second motor/generator 222 by transfer conductors 230E and 230F.

Power from the engine 224 is selectively introduced into the hybrid transmission 210 through the connection of the input shaft 212 with the first planetary gear set 214. An over-run clutch 231 may be incorporated in the input shaft 212 between the engine 224 and the first planetary gear set 214. The over-run clutch 231 allows portion $212_A$ of the input shaft 212 which extends between the engine 224 and the over-run clutch 231 to rotate faster than portion $212_B$ of the input shaft 212 which extends between the overrun clutch 231 and the first planetary gear set 214.

The first planetary gear set 214 has an outer gear member 232, generally designated as a ring gear, which circumscribes an inner gear member 234, generally designated as the sun gear. A plurality of planet gear members 236 are rotatably mounted on a carrier 238 such that each planet gear member 236 meshingly engages both the outer gear member 232 and the inner gear member 234. The outer gear member 232 is connected to portion $212_B$ of the input shaft 212. The carrier 238 is connected to a first sleeve shaft $240_A$ which circumscribes portion $212_B$ of the input shaft 212, and the inner gear member 234 is connected to a second sleeve shaft $240_B$.

The output shaft 218 is directly connected to an outer gear member 244, also generally designated a ring gear, of the second planetary gear set 216. The output shaft 218 is also selectively connected to the carrier 238 of the first planetary gear set 214 by virtue of a first torque transfer device 242.

With reference to the second planetary gear set 216, the outer gear member 244 circumscribes an inner gear member 246, also designated as a sun gear. A plurality of planet gear members 248 are rotatably mounted on a carrier 250 such that each planet gear member 248 meshingly engages both the outer gear member 244 and the inner gear member 246. The inner gear member 246 of the second planetary gear set 216 may, as shown, also be connected to the sleeve shaft $240_B$ so that the inner gear members 234 and 246 of the respective planetary gear sets 214 and 216 are continuously conjoined. The carrier 250 of the second planetary gear set 216 is selectively connected to ground, designated as 252, by virtue of a second torque transfer device 254. By grounding the carrier 250 through the torque transfer device 254, the planet gear members 248 may selectively serve as the reaction members for the second planetary gear set 216. In the same manner as was previously explained in connection with the first embodiment, the second torque transfer device 254 thus serves to effect a power transfer between the first planetary gear set 214 and the output shaft 218.

The second motor/generator 222 is operatively and simultaneously connected to both the first and the second planetary gear sets 214 and 216. Specifically, a drive gear 256 is mounted on a connecting shaft 258 that drives, or is driven by, the second motor/generator 222. The drive gear 256 meshingly engages an output gear 260 that is secured to the sleeve shaft $240_B$. Thus, through the sleeve shaft $240_B$, the second motor/generator 222 is operatively connected to both inner gear members 234 and 246 of the respective first and second planetary gear sets 214 and 216.

The first motor/generator 220 is, in a similar manner, directly connected to only the first planetary gear set 214. Specifically, a drive gear 262 is secured to a connecting shaft 264 that drives, or is driven by, the first motor/generator 220. The drive gear 262 meshingly engages a transfer gear 266 that is presented from the sleeve shaft $240_A$ and the sleeve shaft $240_A$ is directly connected to the carrier 238 of the first planetary gear set 214.

As is also represented in FIG. 5, the output shaft 218 drives, or is driven by, axles 270 and 272 through a differential 274. When the hybrid transmission 210 is used in a land vehicle, each axle 270 and 272 terminates in a respective wheel 276 and 278.

As mentioned earlier, the operator requests certain types of performance from the vehicle depending upon given situations. These different levels of performance include, but are not limited to: direction of travel, acceleration, deceleration, coasting and battery charging. The ECU 228 receives and interprets the operator input and uses the input to control the power flow going into and out of the electrical storage device 226 and the first and second motor/generators 220 and 222. The ECU 228 is also capable of monitoring the power flow of the engine 224, vehicle speed, operator demand, and the level to which the storage device 226 is charged. The ECU 228 is capable of selectively controlling the operational function of the engine 224, the electrical storage device 226, and the first and second motor/generators 220 and 222, respectively. As such, power can be generated, stored or transferred between the various power supply devices. Therefore, the ECU 228 ensures maximum efficiency of the transmission 210 while providing maximum power output.

It will be appreciated that power from the engine 224 rotates the input shaft 212 to transmit power to the outer gear member 232 of the first planetary gear set 214. Conversely, feed-back power from the output shaft 218 may be absorbed back into the engine 224 through portion $212_A$ of the input shaft 212. When energy generated by the momentum of the vehicle is absorbed back into the engine 224, the engine 224 functions as a damper. This situation occurs, for example, when the vehicle is decelerating.

Description of a Third Alternative Embodiment

Figure 6:
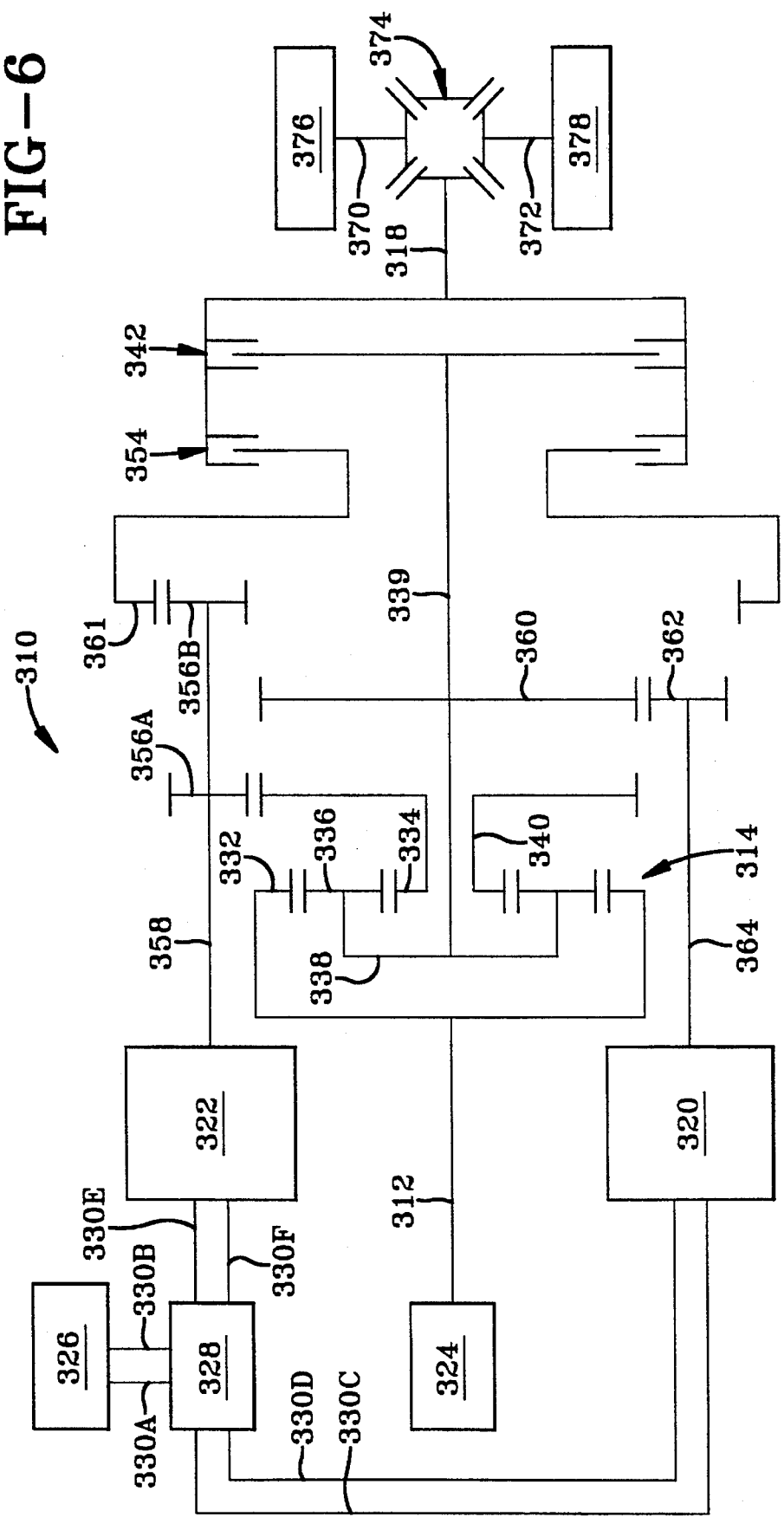
FIG. 6 is a schematic representation, similar to FIGS. 2, 4 and 5, of a third alternative embodiment of a hybrid transmission embodying the concepts of the present invention.

A third alternative form of a hybrid transmission embodying the concepts of the present invention is designated generally by the numeral 310 on FIG. 6. In particular, FIG. 6 shows that the transmission 310 has an input shaft 312, at least a first planetary gear set 314 and an output shaft 318. The transmission 310 also has first and second motor/generators 320 and 322, respectively, which are operatively connected with the first planetary gear set 314.

The hybrid transmission 310 is utilized in a vehicle (not shown), such as a bus or armored vehicle, that is driven by an operator. The transmission 310 receives power from an engine 324 and an electric storage device 326. The hybrid transmission 310 can, as will be hereinafter more fully disclosed, also receive feed-back power from the vehicle axles when the vehicle is decelerating. In this alternative embodiment, the engine 324 is a fossil fuel engine and the electric storage device 326 is one or more batteries. It will be noted that other electric storage devices which have the ability to store electric power and dispense electric power may be used in place of the batteries without altering the concepts of the present invention. It will be appreciated that the electric storage device 326 is communicative with an electrical control unit (ECU) 328 by transfer conductors 330A and 330B. The ECU 328 communicates with the first motor/generator 320 by transfer conductors 330C and 330D, and the ECU 328 similarly communicates with the second motor/generator 322 by transfer conductors 330E and 330F.

Power from the engine 324 is introduced into the planetary gear set 314 of the transmission 310 by the input shaft 312. Specifically, the input shaft 312 is operatively connected to the first planetary gear set 314 through an outer gear member 332. The outer gear member 332, also known as a ring gear, circumscribes an inner gear member 334, also known as a sun gear. A plurality of planet gear members 336 are rotatably mounted on a carrier 338 such that each planet gear member 336 meshingly engages both the outer gear member 332 and the inner gear member 334.

The inner gear member 334 is connected to a sleeve shaft 340, and the carrier 338 is connected to a transfer shaft 339 that extends axially within the sleeve shaft 340. The transfer shaft 339 terminates in a first torque transfer device 342 which permits selective connection between the transfer shaft 339 and the output shaft 318.

The second motor/generator 322 is operatively connected to the first planetary gear set 314. Specifically, a first drive gear 356A is mounted on a connecting shaft 358 that drives, or is driven by, the second motor/generator 322. A second drive gear 356B is also mounted on the connecting shaft 358 meshingly to engage a hub gear 361 that is selectively engaged by a second torque transfer device 354. The second torque transfer device 354 permits selective engagement between the second motor/generator 322—as well as the inner gear member 334 of the first planetary gear set 314—and the output shaft 318 such that a power transfer is effected to the output shaft 318.

The first motor/generator 320 is also operatively connected to the first planetary gear set 314. Specifically, a drive gear 362 is secured to a connecting shaft 364 that drives, or is driven by, the first motor/generator 320. The drive gear 362 meshingly engages an output gear 360 that is secured to the transfer shaft 339, which, as previously described, is permanently secured to the carrier 338.

As in the previous embodiments, the operator requests certain types of performance from the vehicle depending upon given situations. These different levels of performance include, but are not limited to: direction of travel, acceleration, deceleration, coasting and battery charging. The ECU 328 receives and interprets the operator input and uses the input to control the power flow going into and out of the electrical storage device 326 and the first and second motor/generators 320 and 322. The ECU 328 is also capable of monitoring the power flow of the engine 324, vehicle speed, operator demand, and the level to which the storage device 326 is charged. The ECU 328 is capable of selectively controlling the operational function of the engine 324, the electrical storage device 326, and the first and second motor/generators 320 and 322, respectively. As such, power can be generated, stored or transferred between the various power supply devices. Therefore, the ECU 328 ensures maximum efficiency of the transmission 310 while providing maximum power output.

It will be appreciated that power from the engine 324 rotates the input shaft 312 to transmit power to the outer gear member 332 of the first planetary gear set 314. Conversely, power applied by the carrier 338 to the planetary gear members 336 may be absorbed back into the engine 324 through the input shaft 312. When energy is absorbed back into the engine 324, the engine 324 functions as a damper. This situation occurs when the engine is not running, and the vehicle is decelerating. The kinetic energy generated by the momentum of the vehicle is thus fed back into the hybrid transmission 310 through the output shaft 318.

As is also represented in FIG. 6, the output shaft 318 drives, or is driven by, axles 370 and 372 through a differential 374. When the hybrid transmission 310 is used in a land vehicle, each axle 370 and 372 terminates in a respective wheel 376 and 378.

Description of a Fourth Alternative Embodiment

Figure 7:
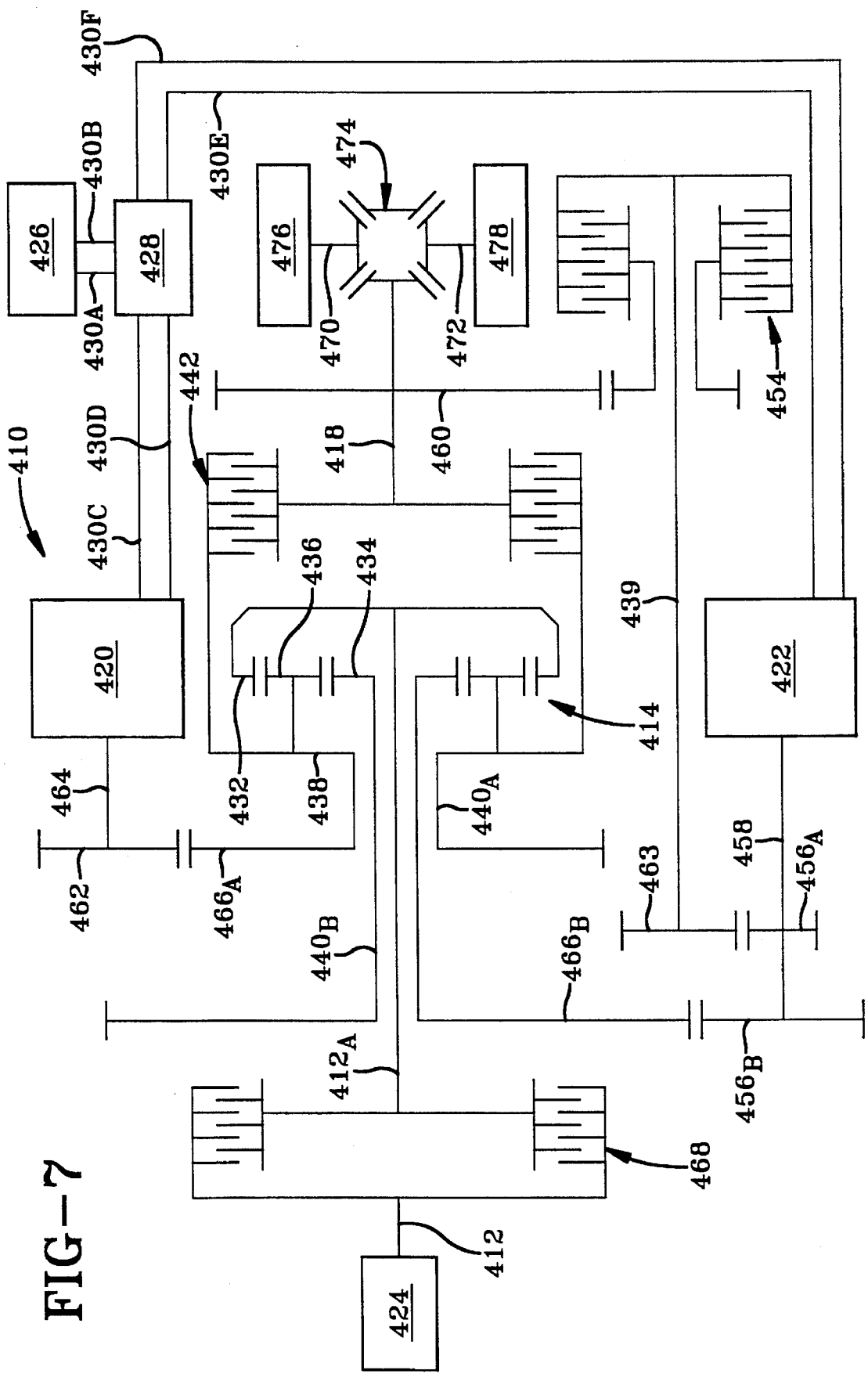
FIG. 7 is a schematic representation, similar to FIGS. 2 and 4 through 6, of a fourth alternative embodiment of a hybrid transmission embodying the concepts of the present invention.

A fourth alternative form of a hybrid transmission embodying the concepts of the present invention is designated generally by the numeral 410 on FIG. 7. In particular, FIG. 7 shows that the transmission 410 has an input shaft 412, at least a first planetary gear set 414 and an output shaft 418. The transmission 410 also has first and second motor/generators 420 and 422, respectively, which are both continuously connected with the first planetary gear set 414. The first motor/generator 420 is, in conjunction with the planetary gear set 414, selectively connectable to the output shaft 418. The second motor/generator 422, on the other hand, is itself selectively connectable to the output shaft 418 independently of the planetary gear set 414.

The hybrid transmission 410 is utilized in a vehicle (not shown), such as a bus or armored vehicle, that is driven by an operator. The transmission 410 selectively receives power from an engine 424 and an electric storage device 426. The hybrid transmission 410 can, as will be hereinafter more fully disclosed, also receive feed-back power from the vehicle axles when the vehicle is decelerating. In this alternative embodiment, the engine 424 is a fossil fuel engine and the electric storage device 426 is one or more batteries. It will be noted that other electric storage devices which have the ability to store electric power and dispense electric power may be used in place of the batteries without altering the concepts of the present invention. It will be appreciated that the electric storage device 426 is communicative with an electrical control unit (ECU) 428 by transfer conductors 430A and 430B. The ECU 428 communicates with the first motor/generator 420 by transfer conductors 430C and 430D, and the ECU 428 similarly communicates with the second motor/generator 422 by transfer conductors 430E and 430F.

Power from the engine 424 is introduced into the planetary gear set 414 of the transmission 410 by the input shaft 412. Specifically, the input shaft 412, as will be hereinafter more fully explained, is operatively connected to an outer gear member 432 of the first planetary gear set 414.

The first planetary gear set 414 has an outer gear member 432, also known as a ring gear, which circumscribes an inner gear member 434, also known as a sun gear. A plurality of planet gear members 436 are rotatably mounted on a carrier 438 such that each planet gear member 436 meshingly engages both the outer gear member 432 and the inner gear member 434. The inner gear member 434 is connected to an inner or first sleeve shaft $440_B$, and the outer gear member 432 is connected to an input shaft extension $412_A$ that extends axially within the inner sleeve shaft $440_B$.

The first motor/generator 420 is continuously connected to the first planetary gear set 414 and, in conjunction with the first planetary gear set 414, selectively connectable to the output shaft 418. Specifically, a drive gear 462 is secured to a connecting shaft 464 that drives, or is driven by, the first motor/generator 420. The drive gear 462 meshingly engages a first transfer gear $466_A$ that is secured to an outer sleeve shaft $440_A$ that is positioned concentrically outwardly of an inner sleeve shaft $440_B$. The outer sleeve shaft $440_A$ is secured to the carrier 438 of the planetary gear set 412, and the carrier 438 is, in turn, connected to a first torque transfer device 442 by which both the carrier 438 and the first motor/generator 420 are simultaneously, but selectively, connectable to the output shaft 418.

The second motor/generator 422 is also continuously connected to the first planetary gear set 414, but in addition, the second motor/generator 422 is selectively connectable to the output shaft 418 independently of the planetary gear set 414. Specifically, a first drive gear $456_A$ is mounted on a connecting shaft 458 that drives, or is driven by, the second motor/generator 422. The first drive gear $456_A$ meshingly engages a take-off gear 463 that is mounted on one end portion of a transfer shaft 439. The opposite end portion of the transfer shaft 439 terminates in a second torque transfer device 454, which selectively connects the second motor/generator 422 to an output gear 460 secured to the output shaft 418. In the same manner as was previously explained in detail with respect to the first embodiment, and as mentioned with respect to the second embodiment, the second torque transfer device 454 thus also serves to effect a power transfer between the first planetary gear set 414 and the output shaft 418.

A second drive gear $456_B$ is also secured to the connecting shaft 458, and the second drive gear $456_B$ meshingly engages a second transfer gear $466_B$ that is secured to the inner sleeve shaft $440_B$.

It is preferred that the input shaft 412 is preferably connected by a third torque transfer device 468 to the input shaft extension $412_A$.

As in the previous embodiments, the operator requests certain types of performance from the vehicle depending upon given situations. These different levels of performance include, but are not limited to: direction of travel, acceleration, deceleration, coasting and battery charging. The ECU 428 receives and interprets the operator input and uses the input to control the power flow going into and out of the electrical storage device 426 and the first and second motor/generators 420 and 422. The ECU 428 is also capable of monitoring the power flow of the engine 424, vehicle speed, operator demand, and the level to which the storage device 426 is charged. The ECU 428 is capable of selectively controlling the operational function of the engine 424, the electrical storage device 426, and the first and second motor/generators 420 and 422, respectively. As such, power can be generated, stored or transferred between the various power supply devices. Therefore, the ECU 428 ensures maximum efficiency of the transmission 410 while providing maximum power output.

It will be appreciated that power from the engine 424 rotates the input shaft 412 to transmit power to the inner gear member 434 of the first planetary gear set 414. Conversely, feed-back power applied by the output shaft 418 to the input shaft 412 may be absorbed back into the engine 424. This situation occurs when the engine is not running, and the vehicle is decelerating. The kinetic energy generated by the momentum of the vehicle is thus fed back into the hybrid transmission 410 through the output shaft 418.

As is also represented in FIG. 7, the output shaft 418 drives, or is driven by, axles 470 and 472 through a differential 474. When the hybrid transmission 410 is used in a land vehicle, each axle 470 and 472 terminates in a respective wheel 476 and 478.

Description of a Fifth Alternative Embodiment

Figure 8:
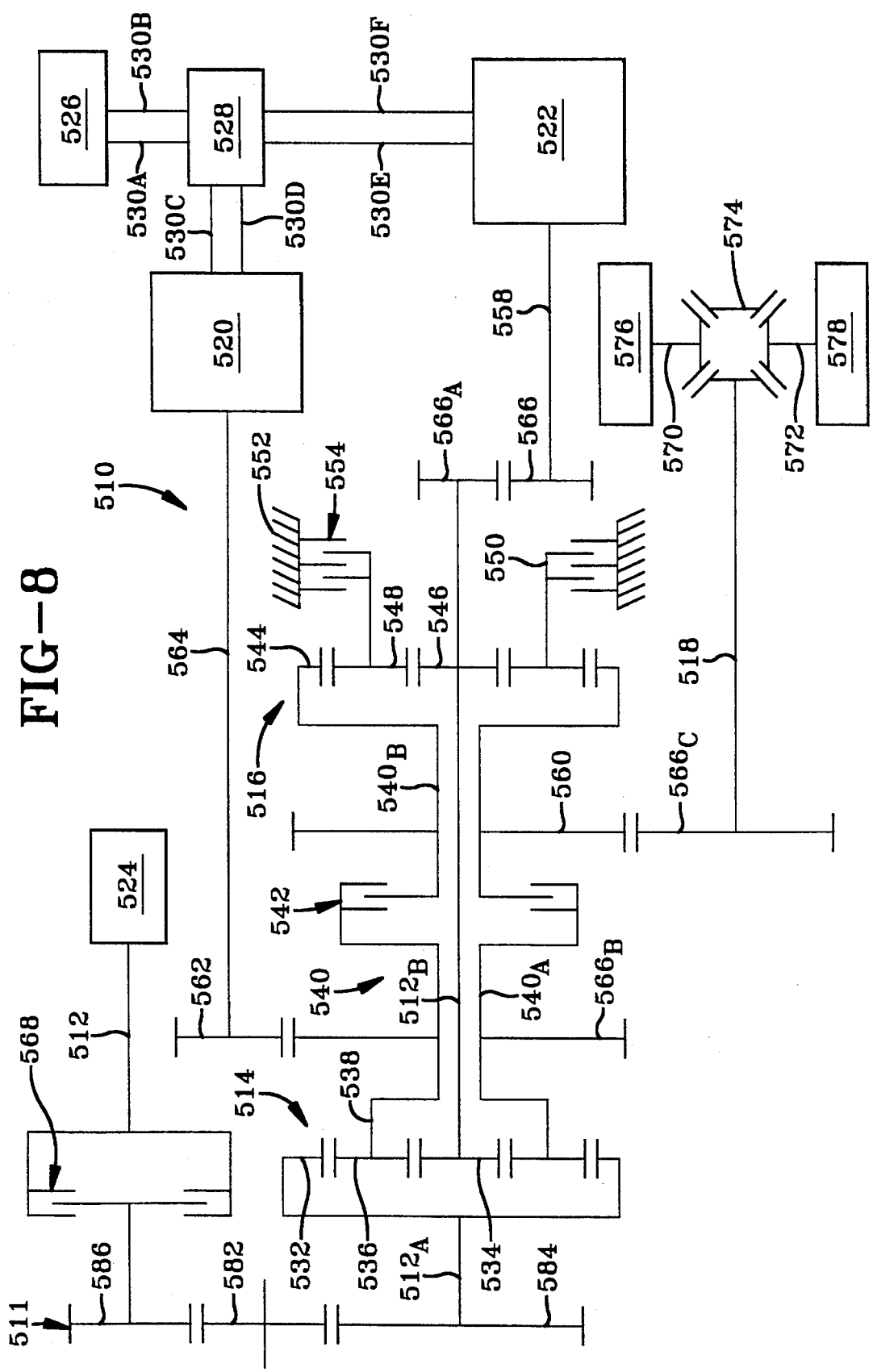
FIG. 8 is a schematic representation, similar to FIGS. 2 and 4 through 7, of a fifth alternative embodiment of a hybrid transmission embodying the concepts of the present invention.

A fifth alternative form of a hybrid transmission embodying the concepts of the present invention is designated generally by the numeral 510 on FIG. 8. In particular, FIG. 8 shows that the transmission 510 has an input shaft 512, first and second planetary gear sets 514 and 516, respectively, and an output member 518 which may be in the form of the gear depicted. The transmission 510 also has first and second motor/generators 520 and 522, respectively, which are connected with both the first and the second planetary gear sets 514 and 516. The first motor/generator 520 is continuously connected to the first planetary gear set 514 and is, in conjunction with the first planetary gear set 514, selectively connected to the second planetary gear set 516. The second motor/generator 522, however, is continuously connected to both the first and the second planetary gears sets 514 and 516.

The hybrid transmission 510 is utilized in a vehicle (not shown), such as a bus or armored vehicle, that is driven by an operator. The transmission 510 selectively receives power from an engine 524 and an electric storage device 526. The hybrid transmission 510 can, as will be hereinafter more fully disclosed, also receive feed-back power from the vehicle axles when the vehicle is decelerating. In this alternative embodiment, the engine 524 is a fossil fuel engine and the electric storage device 526 is one or more batteries. It will be noted that other electric storage devices which have the ability to store electric power and dispense electric power may be used in place of the batteries without altering the concepts of the present invention. It will be appreciated that the electric storage device 526 is communicative with an electrical control unit (ECU) 528 by transfer conductors 530A and 530B. The ECU 528 communicates with the first motor/generator 520 by transfer conductors 530C and 530D, and the ECU 528 similarly communicates with the second motor/generator 522 by transfer conductors 530E and 530F.

Power from the engine 524 is selectively introduced into the hybrid transmission 510 through an input drive train 511 that is, as will be hereinafter more fully described, connected to an outer gear member 532 of the first planetary gear set 514.

The first planetary gear set 514 has an outer gear member 532, generally designated as a ring gear, which circumscribes an inner gear member 534, generally designated as the sun gear. A plurality of planet gear members 536 are rotatably mounted on a carrier 538 such that each planet gear member 536 meshingly engages both the outer gear member 532 and the inner gear member 534. The inner gear member 534 is, as shown, connected to an input shaft extension $512_B$, and the carrier 538 is connected to portion $540_A$ of a sleeve shaft 540 which rotatably circumscribes the input shaft extension $512_B$.

The input shaft extension $512_B$ is also directly connected to an inner gear member 546, also generally designated a sun gear, of the second planetary gear set 516. The inner gear member 546 is circumscribed by an outer gear member 544, also designated as a ring gear. A plurality of planet gear members 548 are rotatably mounted on a carrier 550 such that each planet gear member 548 meshingly engages both the inner gear member 546 and the outer gear member 544. The outer gear member 544 of the second planetary gear set 516 may, as shown, also be connected to the second portion $540_B$ of the sleeve shaft 540 so that the carrier 538 of the first planetary gear set 514 is selectively connectable to the outer gear member 544 of the second planetary gear set 516. The selective connection may be achieved by first torque transfer device 542.

The carrier 550 of the second planetary gear set 516 is selectively connected to ground, designated as 552, by virtue of a second torque transfer device 554. By grounding the carrier 550 through the second torque transfer device 554, the planet gear members 548 may selectively serve as the reaction members for the second planetary gear set 516, and, as was explained in detail with respect to the first embodiment, the second torque transfer device 554 thereby effects a power transfer between one member in the first planetary gear set 514 and the output shaft 518.

The second motor/generator 522 is operatively, and simultaneously, connected to both the first and the second planetary gear sets 514 and 516. Specifically, a drive gear 556 is mounted on a connecting shaft 558 that drives, or is driven by, the second motor/generator 522. The drive gear 556 meshingly engages a first transfer gear $566_A$ that is secured to the input shaft extension $512_B$. Thus, through the input shaft extension $512_B$ the second motor/generator 522 is operatively connected to both inner gear members 534 and 546 of the respective first and second planetary gear sets 514 and 516.

The first motor/generator 520 is, in a similar manner, connected to the first planetary gear set 514. Specifically, a drive gear 562 is secured to a connecting shaft 564 that drives, or is driven by, the first motor/generator 520. The drive gear 562 meshingly engages a second transfer gear $566_B$ presented from portion $540_A$ of the sleeve shaft 540.

A third torque transfer device 568 may be employed selectively to connect the input shaft 512 to the outer gear member 532 of the first planetary gear set 514. The input shaft 512 may have the third torque transfer device 568 incorporated therein such that the input shaft 512 is connected directly to the outer gear member 532 of the first planetary gear set 514. As shown, however, the third torque transfer device 568 may be interposed between the engine 524 and a take-off gear 580 which meshingly engages an idler gear 582. The idler gear 582, in turn, meshingly engages an input gear 584 mounted on an offset portion $512_A$ of the input shaft 512, and in the representative arrangement depicted, it is the offset portion $512_A$ of the input shaft 512 that is operatively connected to the outer gear member 532 of the first planetary gear set 514.

As is also represented in FIG. 8, the output shaft 518 presents a transfer gear $566_C$ that meshingly engages the output gear 560 which is secured to portion $540_B$ of the sleeve shaft 540. As such, the output shaft 518 drives, or is driven by, axles 570 and 572 through a differential 574. When the hybrid transmission 510 is used in a land vehicle, each axle 570 and 572 terminates in a respective wheel 576 and 578.

As discussed with respect to each of the embodiments, the operator requests certain types of performance from the vehicle depending upon given situations. These different levels of performance include, but are not limited to: direction of travel, acceleration, deceleration, coasting and battery charging. The ECU 526 receives and interprets the operator input and uses the input to control the power flow going into and out of the electrical storage device 526 and the first and second motor/generators 520 and 522. The ECU 528 is also capable of monitoring the power flow of the engine 524, vehicle speed, operator demand, and the level to which the storage device 526 is charged. The ECU 528 is capable of selectively controlling the operational function of the engine 524, the electrical storage device 526, and the first and second motor/generators 520 and 522, respectively. As such, power can be generated, stored or transferred between the various power supply devices. Therefore, the ECU 528 ensures maximum efficiency of the transmission 510 while providing maximum power output.

Description of a Sixth Alternative Embodiment

Figure 9:
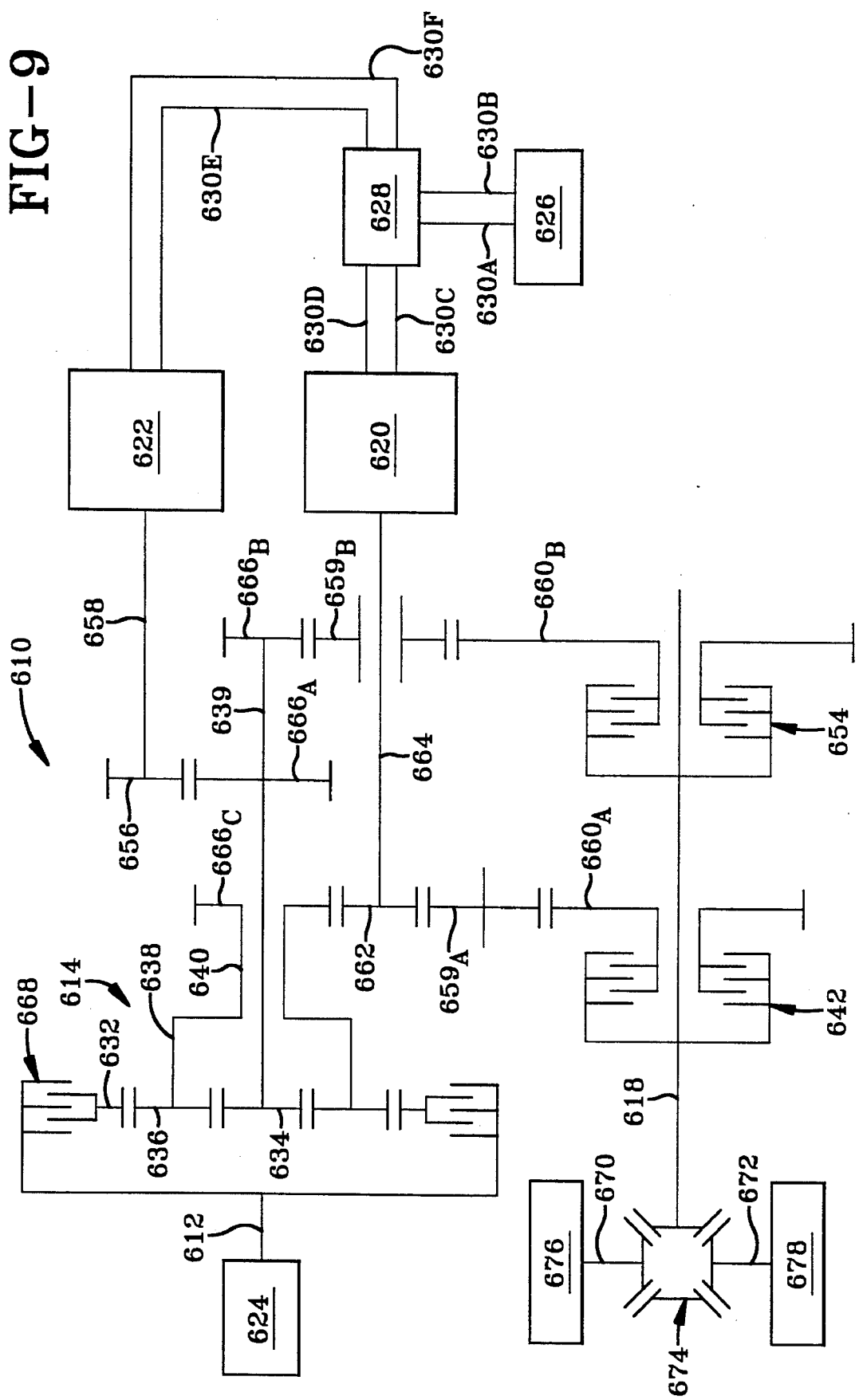
FIG. 9 is a schematic representation, similar to FIGS. 2 and 4 through 8, of a sixth alternative embodiment of a hybrid transmission embodying the concepts of the present invention.

A sixth alternative form of a hybrid transmission embodying the concepts of the present invention is designated generally by the numeral 610 on FIG. 9. With particular reference to FIG. 9 it will be observed that the transmission 610 has an input shaft 612, at least a first planetary gear set 614 and an output shaft 618. The transmission 610 also has first and second motor/generators 620 and 622, respectively, which are both continuously connected with the first planetary gear set 614 and selectively connected to the output shaft 618.

The hybrid transmission 610 is utilized in a vehicle (not shown), such as a bus or armored vehicle, that is driven by an operator. The transmission 610 selectively receives power from an engine 624 and an electric storage device 626. The hybrid transmission 610 can, as will be hereinafter more fully discussed, also receive feed-back power from the vehicle axles when the vehicle is decelerating. In this exemplary embodiment, the engine 624 may be a fossil fuel engine, and the electric storage device 626 may be one or more batteries. It will be noted that other electric storage devices which have the ability to store electric power and dispense electric power may be used in place of the batteries without altering the concepts of the present invention. The electric storage device 626 communicates with an electrical control unit (ECU) 628 by transfer conductors 630A and 630B. The ECU 628 communicates with the first motor/generator 620 by transfer conductors 630C and 630D, and the ECU 628 similarly communicates with the second motor/generator 622 by transfer conductors 630E and 630F.

Power from the engine 624 is selectively delivered to an outer ring member 632 of the planetary gear set 614 in the hybrid transmission 610. The outer gear member 632 is generally designated as a ring gear, and the outer gear member 632 circumscribes an inner gear member 634, generally designated as the sun gear. A plurality of planet gear members 636 are rotatably mounted on a carrier 638 such that each planet gear member 636 meshingly engages both the outer gear member 632 and the inner gear member 634.

The inner gear member 634 is connected to a transfer shaft 639 which extends axially within a sleeve shaft 640. The transfer shaft 639 presents first and second transfer gears $666_A$ and $666_B$ for a purpose more fully hereinafter described. One end portion of the sleeve shaft 640 is connected to the carrier 638, and the other end portion of the sleeve shaft 640 terminates in a third transfer gear $666_C$, the purpose for which will also be hereinafter more fully described.

The first motor/generator 620 is continuously connected to the first planetary gear set 614 and, conjointly with the first planetary gear set 614, selectively connected to the output shaft 618. Specifically, a drive gear 662 is mounted on a connecting shaft 664 that drives, or is driven by, the first motor/generator 620. The drive gear 662 meshingly engages the third transfer gear $666_C$ presented from the sleeve shaft 640, which arrangement effects a continuous connection between the first motor/generator 620 and the carrier 638 in the planetary gear set 614. The drive gear 662 also meshingly engages a first idler gear $659_A$ which also meshingly engages a first output gear $660_A$ that is secured to a first torque transfer device 642. The first torque transfer device 642 is also connected to the output shaft 618, thereby effecting the selective connection between the first motor/generator 620 and the output shaft 618.

The second motor/generator 622 is also continuously connected to the first planetary gear set 614 and, conjointly with the first planetary gear set 614, selectively connected to the output shaft 618. Specifically, a drive gear 656 is secured to a connecting shaft 658 that drives, or is driven by, the second motor/generator 622. The drive gear 656 meshingly engages the first transfer gear $666_A$ that is secured to the transfer shaft 639 in order to effect the continuous connection between the second motor/generator 622 and the inner gear member 634 of the planetary gear set 614. The second transfer gear $666_B$ secured to the transfer shaft 639 meshingly engages an idler gear $659_B$ that is journalled on the connecting shaft 664. The idler gear $659_B$ meshingly engages a second output gear $660_B$ that is secured to a second torque transfer device 654. The second torque transfer device 654 is also connected to the output shaft 618, thereby effecting the selective connection between the inner gear member 634 of the planetary gear set 614 and the output shaft 618. As such, the second torque transfer device 654 serves to effect a power transfer between the first planetary gear set 614 and the output shaft 618.

The outer gear member 632 in the planetary gear set 614 is preferably connected to the input shaft 612 by a third torque transfer device 668.

As is also represented in FIG. 9, the output shaft 618 drives, or is driven by, axles 670 and 672 through a differential 674. When the hybrid transmission 610 is used in a land vehicle, each axle 670 and 672 terminates in a respective wheel 676 and 678.

In this embodiment, as well, the operator requests certain types of performance from the vehicle depending upon given situations. These different levels of performance include, but are not limited to: direction of travel, acceleration, deceleration, coasting and battery charging. The ECU 628 receives and interprets the operator input and uses the input to control the power flow going into and out of the electrical storage device 626 and the first and second motor/ generators 620 and 622. The ECU 628 is also capable of monitoring the power flow of the engine 624, vehicle speed, operator demand, and the level to which the storage device 626 is charged. The ECU 628 is capable of selectively controlling the operational function of the engine 624, the electrical storage device 626, and the first and second motor/generators 620 and 622, respectively. As such, power can be generated, stored or transferred between the various power supply devices. Therefore, the ECU 628 ensures maximum efficiency of the transmission 610 while providing maximum power output.

It will be appreciated that power from the engine 624 rotates the input shaft 612 to transmit power to the outer gear member 632 in the planetary gear set 614. Conversely, feed-back power from the output shaft 618 may be absorbed back into the engine 624 through the input shaft 112. This situation occurs, for example, when the vehicle is decelerating.

Description of a Seventh Alternative Embodiment

Figure 10:
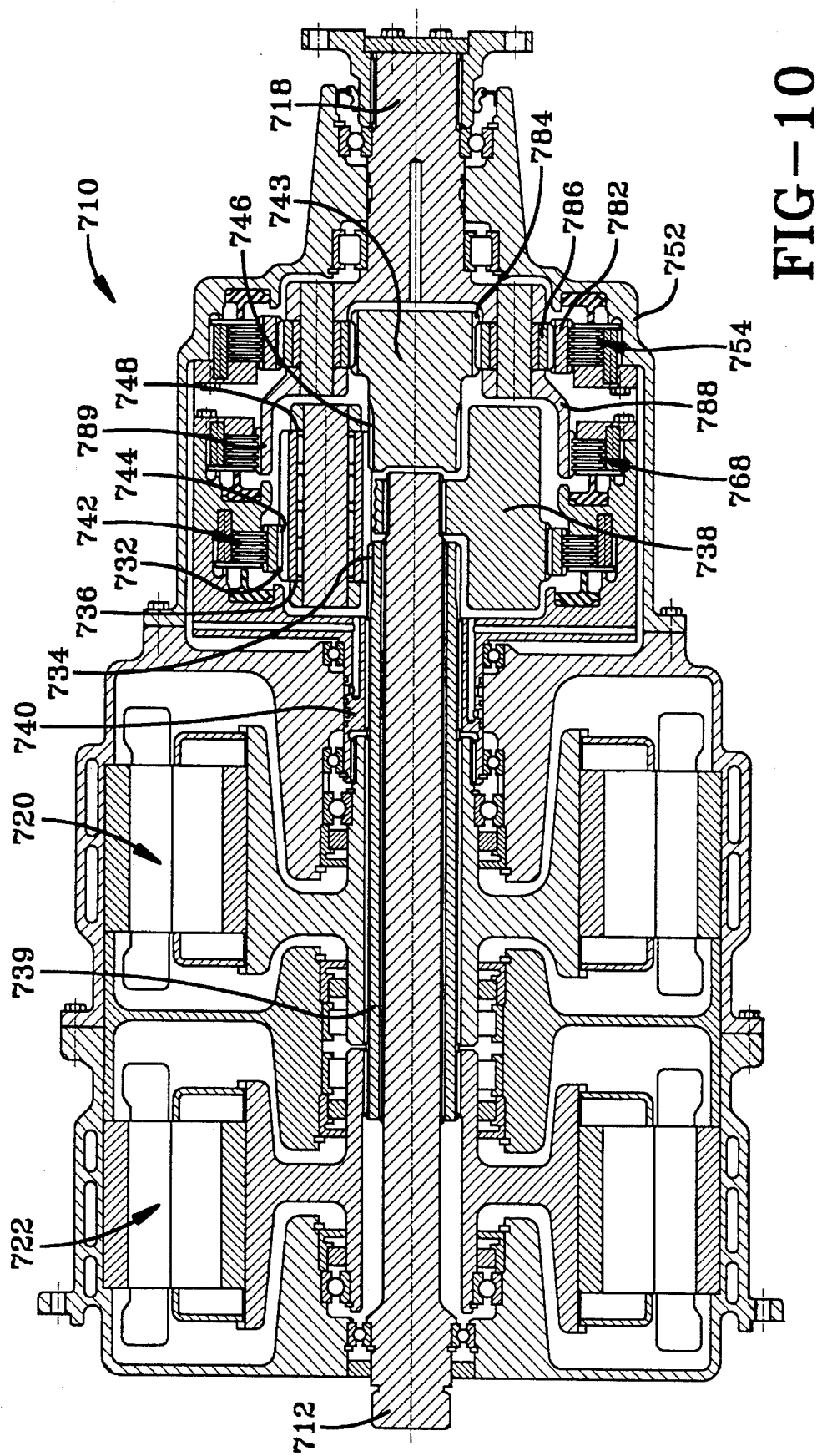
FIG. 10 is a diagrammatic, longitudinal cross section through a third highly preferred embodiment of a hybrid transmission embodying the concepts of the present invention; and, FIG. 11 is a schematic representation, similar to FIGS. 2 and 4 through 9, of the third preferred alternative embodiment of the hybrid transmission depicted in FIG. 10 and embodying the concepts of the present invention.
Figure 11:
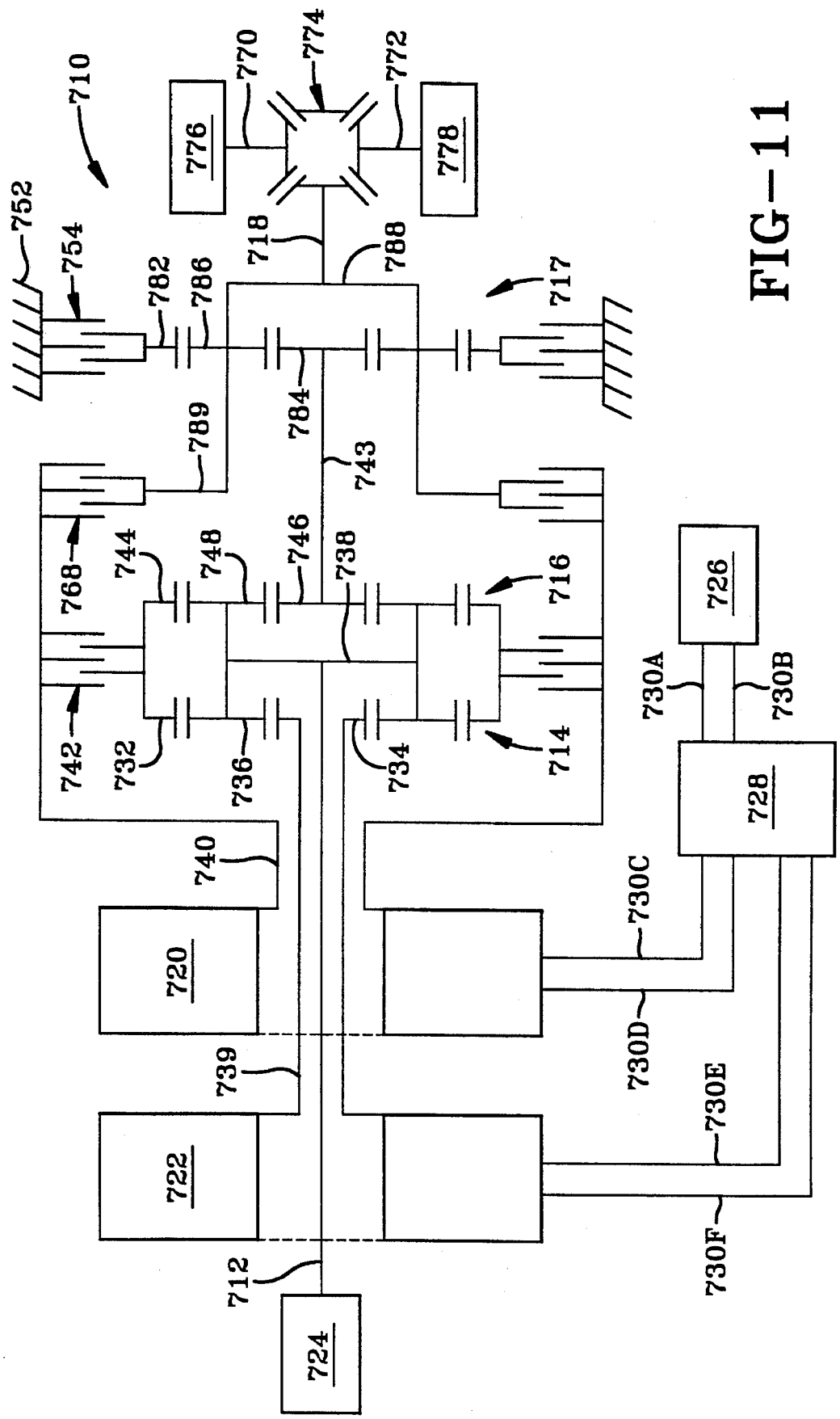

A seventh alternative, and also a third highly preferred, embodiment of a hybrid transmission embodying the concepts of the present invention is designated generally by the numeral 710 on FIGS. 10 and 11. With particular reference to FIG. 11, it will be observed that the transmission 710 has an input shaft 712, a first planetary gear set 714, a second planetary gear set 716, a third planetary gear set 717 and an output shaft 718. The transmission 710 also has first and second motor/generators 720 and 722, respectively. As will be hereinafter described in greater detail, the first motor/ generator 720 is selectively connected to the first planetary gear set 714, the second planetary gear set 716 as well as to and through the third planetary gear set 717 to the output shaft 718. The second motor/generator 722 is continuously connected to the first planetary gear set 714.

The hybrid transmission 710 may also be utilized in a vehicle (not shown), such as a bus or armored vehicle, that is driven by an operator. The transmission 710 selectively receives power from an engine 724 and an electric storage device 726. The hybrid transmission 710 can, as will also be hereinafter more fully discussed, receive feed-back power from the vehicle axles when the vehicle is decelerating. In this exemplary embodiment, the engine 724 may be a fossil fuel engine, and the electric storage device 726 may be one or more batteries. It will be noted that other electric storage devices that have the ability to store electric power and dispense electric power may be used in place of the batteries without altering the concepts of the present invention. The electric storage device 726 communicates with an electrical control unit (ECU) 728 by transfer conductors 730A and 730B. The ECU 728 communicates with the first motor/ generator 720 by transfer conductors 730C and 730D, and the ECU 728 similarly communicates with the second motor/generator 722 by transfer conductors 730E and 730F.

Power from the engine 724 is delivered through the input shaft 712 to a carrier 738 common to the first and second planetary gear sets 714 and 716, respectively, in the hybrid transmission 710. A plurality of planet gear members 736 associated with the first planetary gear set 714 are rotatably mounted on the carrier 738, such that each planet gear member 736 meshingly engages both the outer gear member 732 and the inner gear member 734 of the first planetary gear set 714. The outer gear member 732, generally designated as a ring gear, circumscribes the inner gear member 734, generally designated as the sun gear.

A plurality of planet gear members 748 (which may be integral with planet gear members 736 associated with the first planetary gear set 714, as shown in FIG. 10) associated with the second planetary gear set 716 are also rotatably mounted on the common carrier 738, such that each planet gear member 748 meshingly engages both the outer gear member 744 and the inner gear member 746 of the second planetary gear set 716. The outer gear member 744, generally designated as the ring gear, circumscribes the inner gear member 746, generally designated as the sun gear. As shown in FIG. 10, the outer gear member 744 of the second planetary gear set 716 may be integral with the outer gear member 732 of the first planetary gear set 714.

The inner gear member 734 of the first planetary gear set 714 is connected to or integral with one end of a first sleeve shaft 739. The other end of the first sleeve shaft 739 is connected to drive or be driven by the second motor/ generator 722. This arrangement effects a continuous connection between the second motor/generator 722 and the inner gear member 734 of the first planetary gear set 714. A second sleeve shaft 740 drives or is driven by the first motor/generator 720. First and third torque transfer deceives 742 and 768 are mounted on an extension ring 741 presented from the second sleeve shaft 740. The first torque transfer device 742 effects a selective, simultaneous connection between first motor/generator 720 and the outer gear member 732 of the first planetary gear set 714, as well as the outer gear member 744 of the second planetary gear set 716, thereby effecting a selective connection between the first motor/generator 720 and both the first and second planetary gear sets 714 and 716.

The inner gear member 746 of the second planetary gear set 716 is directly connected to an inner gear member 784 of the third planetary gear set 717 by a transfer shaft 743. The inner gear member 784 is circumscribed by an outer gear member 782 that is selectively connected to ground 752 by a second torque transfer device 754. A plurality of planet gear members 786 are rotatably mounted on a carrier 788, such that each planet gear member 786 meshingly engages both the outer gear member 782 and the inner gear member 784. The carrier 788 is directly connected to the output shaft 718.

The carrier 788 also presents an extension 789 that is selectively connected to the extension ring 741 by a third torque transfer device 768. Thus, when the third torque transfer device 768 is engaged, the first motor/generator 720 is directly connected to the output shaft 718. It can also be understood that when both the first and third torque transfer devices 742 and 768, respectively, are engaged, the outer gear members 732 and 744 of the first and second planetary gear sets 714 and 716 are connected to the output shaft 718 through the carrier 788.

As is also represented in FIG. 10, the output shaft 718 drives or is driven by the axles 770 and 772 through a differential 774. When the hybrid transmission 710 is used in a land vehicle, each axle 770 and 772 terminates in a respective wheel 776 and 778.

In this embodiment, as well, the operator requests certain types of performance from the vehicle depending upon given situations. These different levels of performance include, but are not limited to: direction of travel, acceleration, deceleration, coasting and battery charging. The ECU 728 receives and interprets the operator input and uses the input to control the power flow going into and out of the electrical storage device 726 and the first and second motor/generators 720 and 722. The ECU 728 is also capable of monitoring the power flow of the engine 724, vehicle speed, operator demand, and the level to which the storage device 726 is charged. The ECU 728 is capable of selectively controlling the operational function of the engine 724, the electrical storage device 726, and the first and second motor/generators 720 and 722, respectively. As such, power can be generated, stored or transferred between the various power supply devices. Therefore, the ECU 728 ensures maximum efficiency of the transmission 710 while providing maximum power output.

It will be appreciated that power from the engine 724 rotates the input shaft 712 to transmit power to the outer gear member 723 in the planetary gear set 714. Conversely, feed-back power from the output shaft 718 may be absorbed back into the engine 724 through the input shaft 712. This situation occurs, for example, when the vehicle is decelerating.

Conclusion

Seven alternative embodiments, at least three of which are highly preferred, of the present invention are disclosed, and it is to be clearly understood that the aforesaid embodiments are susceptible to numerous additional changes apparent to one skilled in the art. Therefore, the scope of the present invention is not to be limited to the details shown and described but is intended to include all changes and modifications which come within the scope of the appended claims.

As should now be apparent, the present invention teaches that a two-mode, split-input, parallel, hybrid transmission embodying the concepts of the present invention is capable of accomplishing the objects thereof.

I claim:

1. A hybrid transmission, comprising:

an input means to receive power from an engine;

power output means;

first and second motor/generators;

energy storage means for accepting power from, and supplying power to, said first and second motor/generators;

control means for regulating power flow between said energy storage means and said motor/generators as well as between said first and second motor/generators;

at least a first planetary gear set;

said first planetary gear set having at least three members including an inner gear member, an outer gear member and a carrier gear member having a plurality of planet gear members which meshingly engage both of the inner and outer gear members;

means operatively to connect said first motor/generator to a first of said gear members in said first planetary gear set means operatively to connect said second motor/generator to a second of said gear members in said first planetary gear set;

means operatively to connect said input means to a third of said gear members of said first planetary gear set;

means operatively to connect one of said gear members in said first planetary gear set to said power output means;

a first torque transfer device selectively effecting an operative connection between one of said gear members in said first planetary gear set and said power output means; and a second torque transfer device selectively effecting a power transfer between another of said gear members in said first planetary gear set and said power output means.

2. A hybrid transmission, as set forth in claim 1, wherein:

said second motor/generator is operatively connected to said inner gear member.

3. A hybrid transmission, as set forth in claim 1, further comprising:

a third torque transfer device;

said third torque transfer device selectively effecting an operative connection between said input means and the remaining member of said first planetary gear set.

4. A hybrid transmission, as set forth in claim 1, wherein:

said first torque transfer device selectively effecting an operative connection between one of said motor/generators and said power output means.

5. A hybrid transmission, as set forth in claim 1, wherein:

said second torque transfer device selectively effecting a power transfer between the other of said motor/generators and said power output means.

6. A hybrid transmission, as set forth in claim 1, wherein:

said first torque transfer device selectively effecting an operative connection between said outer gear member of said planetary gear set and said power output means.

7. A hybrid transmission, as set forth in claim 1, wherein:

said second torque transfer device selectively effecting a power transfer between said inner gear member of said planetary gear set and said power output means.

8. A hybrid transmission, as set forth in claim 3, wherein:

said second torque transfer device selectively effecting a power transfer between said inner gear member of said planetary gear set and said power output means.

9. A hybrid transmission, as set forth in claim 8, wherein:

said planet gear members are supported on a carrier; and, said third torque transfer device selectively effecting an operative connection between said input means and said carrier.

10. A hybrid transmission, as set forth in claim 1, wherein:

said first motor/generator is operatively connected to said planet gear members of said first planetary gear set.

11. A hybrid transmission, as set forth in claim 10, further comprising:

a first torque transfer device;

said first torque transfer device selectively effecting an operative connection between one of said gear members in said first planetary gear set and said power output means;

a second torque transfer device;

said second torque transfer device selectively effecting a power transfer between another of said gear members in said first planetary gear set and said power output means; and, a third torque transfer device interposed between said input means and said first planetary gear set.

12. A hybrid transmission, as set forth in claim 10, wherein:

said planet gear members are rotatably mounted on a carrier;

said first motor/generator is operatively connected to said carrier; and, said input means is operatively connected to said outer gear member of said first planetary gear set.

13. A hybrid transmission, as set forth in claim 10, further comprising:

a second planetary gear set;

said second planetary gear set having an inner gear member and an outer gear member, each of which meshingly engage a plurality of planet gear members; and, said outer gear member in said second planetary gear set being operatively connected with said power output means.

14. A hybrid transmission, as set forth in claim 13, further comprising:

a second torque transfer device selectively operable to ground said planet gear members of said second planetary gear set.

15. A hybrid transmission, as set forth in claim 13, wherein:

said inner gear member of said second planetary gear set is operatively connected to said second motor/generator.

16. A hybrid transmission, as set forth in claim 15, wherein:

said inner gear member of said second planetary gear set is operatively connected to said inner gear member of said first planetary gear set.

17. A hybrid transmission, as set forth in claim 12, further comprising:

a selectively operable first torque transfer device interposed in the operative connection between said carrier in said first planetary gear set and said power output means.

18. A hybrid transmission, as set forth in claim 17, further comprising:

a second torque transfer device interposed between said inner gear member of said first planetary gear set and said power output means.

19. A hybrid transmission, as set forth in claim 18, wherein:

said second torque transfer device is also interposed in the operative connection between said second motor/generator and said power output means.

20. A hybrid transmission, as set forth in claim 2, further comprising:

a first torque transfer device;

said first torque transfer device selectively effecting an operative connection between said outer gear member in said first planetary gear set and said first motor/generator; and, a second torque transfer device;

said second torque transfer device selectively effecting an operative connection between said power output means and said first motor generator.

21. A hybrid transmission, as set forth in claim 20, wherein:

said planet gear members are supported on a carrier;

said carrier is operatively connected to said input means; and said second motor/generator is operatively connected to said inner gear member in said first planetary gear set.

22. A hybrid transmission, as set forth in claim 21, further comprising:

a second planetary gear set;

said second planetary gear set having an inner gear member and an outer gear member each of which meshingly engage a plurality of planet gear members;

said planet gear members are supported on a carrier;

said carrier in said second planetary gear set being operatively connected to said carrier in said first planetary gear set; and, said outer gear member of said second planetary gear set being operatively connected to said outer gear member in said first planetary gear set.

23. A hybrid transmission, as set forth in claim 22, further comprising:

a third planetary gear set;

said third planetary gear set having an inner gear member and an outer gear member each of which meshingly engage a plurality of planet gear members;

said planet gear members are supported on a carrier;

said inner gear member of said third planetary gear set being operatively connected to said inner gear member of said second planetary gear set;

said second torque transfer device selectively effecting an operative connection between said first motor/generator and said carrier in said third planetary gear set; and, a third torque transfer device;

said third torque transfer device selectively operable to ground said outer gear member of said third planetary gear set.

* * * * *